(12) United States Patent  
Tamura

(10) Patent No.: US 8,127,341 B2  
(45) Date of Patent: Feb. 28, 2012

(54) INFORMATION PROCESSING APPARATUS, INFORMATION PROCESSING METHOD, PERIPHERAL APPARATUS, AND AUTHORITY CONTROL SYSTEM

(75) Inventor: Yuu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 11/776,234

(22) Filed: Jul. 11, 2007

(65) Prior Publication Data

US 2008/0052768 A1    Feb. 28, 2008

(30) Foreign Application Priority Data

Jul. 14, 2006    (JP) ................ 2006-194351

(51) Int. Cl.  
G06F 7/04    (2006.01)

(52) U.S. Cl. .................... 726/4; 358/1.15

(58) Field of Classification Search ............ 726/4, 9, 726/26–33; 380/51, 55; 358/1.15, 1.9; 395/101; 713/156, 176, 201  
See application file for complete search history.

(56) References Cited

U.S. PATENT DOCUMENTS

| | | | | |
|---|---|---|---|---|
| 6,327,656 B2 * | 12/2001 | Zabetian | ................ | 713/176 |
| 6,385,725 B1 * | 5/2002 | Baum-Waidner | ............ | 713/175 |
| 6,385,728 B1 * | 5/2002 | DeBry | ................. | 726/9 |
| 6,717,689 B1 * | 4/2004 | Endo et al. | ................. | 358/1.15 |
| 6,952,780 B2 * | 10/2005 | Olsen et al. | ................. | 726/26 |
| 6,965,682 B1 * | 11/2005 | Davis et al. | ................. | 382/100 |
| 7,167,253 B2 * | 1/2007 | Endoh et al. | ................. | 358/1.14 |
| 7,207,069 B2 * | 4/2007 | Foster et al. | ................. | 726/30 |
| 7,299,234 B2 * | 11/2007 | Focazio et al. | ................. | 707/703 |
| 7,318,086 B2 * | 1/2008 | Chang et al. | ................. | 709/217 |
| 7,586,641 B2 * | 9/2009 | Takaragi et al. | ................. | 358/1.9 |
| 7,609,402 B2 * | 10/2009 | Chang et al. | ................. | 358/1.15 |
| 7,657,610 B2 * | 2/2010 | Takahashi et al. | ................. | 709/219 |
| 7,907,296 B2 * | 3/2011 | Endo et al. | ................. | 358/1.15 |
| 2002/0016921 A1 * | 2/2002 | Olsen et al. | ................. | 713/200 |
| 2002/0042884 A1 * | 4/2002 | Wu et al. | ................. | 713/201 |
| 2002/0080959 A1 * | 6/2002 | Weller | ................. | 380/55 |
| 2002/0169721 A1 * | 11/2002 | Cooley et al. | ................. | 705/51 |
| 2002/0184518 A1 * | 12/2002 | Foster et al. | ................. | 713/200 |
| 2005/0120244 A1 * | 6/2005 | Choi | ................. | 713/201 |
| 2005/0165776 A1 * | 7/2005 | Focazio et al. | ................. | 707/4 |
| 2006/0098226 A1 * | 5/2006 | Morita | ................. | 358/1.15 |
| 2006/0106720 A1 * | 5/2006 | Nakazawa | ................. | 705/50 |
| 2006/0107039 A1 * | 5/2006 | Sugiura et al. | ................. | 713/156 |
| 2006/0119891 A1 | 6/2006 | Shimizu | | |
| 2006/0203255 A1 * | 9/2006 | Takaragi et al. | ................. | 358/1.1 |
| 2007/0117609 A1 * | 5/2007 | White et al. | ................. | 463/17 |
| 2007/0171458 A1 * | 7/2007 | Kimura | ................. | 358/1.15 |
| 2007/0201926 A1 * | 8/2007 | Kato | ................. | 400/62 |

(Continued)

FOREIGN PATENT DOCUMENTS

JP    2001-071604 A    3/2001

(Continued)

*Primary Examiner* — Saleh Najjar  
*Assistant Examiner* — Shu Chun Gao  
(74) *Attorney, Agent, or Firm* — Canon USA, Inc., I.P. Division

(57) ABSTRACT

A printer driver configured to acquire print control information for controlling a function provided by a peripheral apparatus includes: a first access control information requesting unit configured to acquire print control information corresponding to an authority according to signatory information included in a signature provided to a document; and a sending unit configured to send a print job that allows the peripheral apparatus to perform processing controlled according to the acquired print control information.

14 Claims, 18 Drawing Sheets

U.S. PATENT DOCUMENTS

2008/0072052 A1 * 3/2008 Suzuki .................. 713/176

FOREIGN PATENT DOCUMENTS

| JP | 2005-031784 | A | | 2/2005 |
| JP | 2005-032004 | A | | 2/2005 |
| JP | 2005-301602 | A | | 10/2005 |
| WO | WO/2004/072845 | | * | 8/2004 |
| WO | WO2004/072845 | | | 8/2004 |
| WO | WO2004072845 | | * | 8/2004 |

* cited by examiner

FIG.5

| [USER] | [COLOR/MONOCHROMATIC PRINTING] | [ONE-SIDED/TWO-SIDED PRINTING] | [n-up PRINTING] | [etc] |
|---|---|---|---|---|
| USER A | BOTH COLOR/MONOCHROMATIC PRINTING AVAILABLE | BOTH ONE-SIDED/TWO-SIDED PRINTING AVAILABLE | NOT RESTRICTED | ... |
| USER B | MONOCHROMATIC PRINTING ONLY | BOTH ONE-SIDED/TWO-SIDED PRINTING AVAILABLE | 2-up OR MORE PRINTING REQUIRED | ... |
| USER C | BOTH COLOR/MONOCHROMATIC PRINTING AVAILABLE | TWO-SIDED PRINTING ONLY | 2-up OR MORE PRINTING REQUIRED | ... |
| USER D | MONOCHROMATIC PRINTING ONLY | TWO-SIDED PRINTING ONLY | 4-up OR MORE PRINTING REQUIRED | ... |
| ... | ... | ... | ... | ... |
| ... | ... | ... | ... | ... |

401

FIG.10
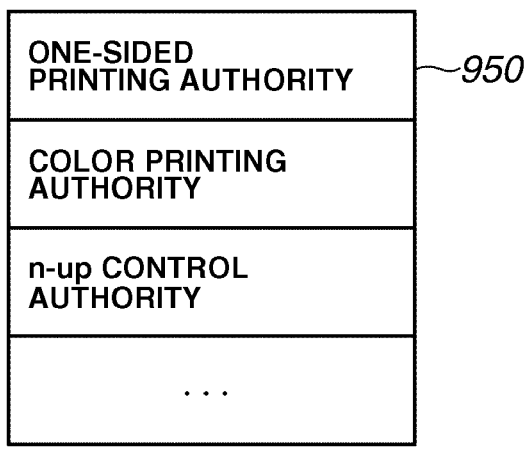
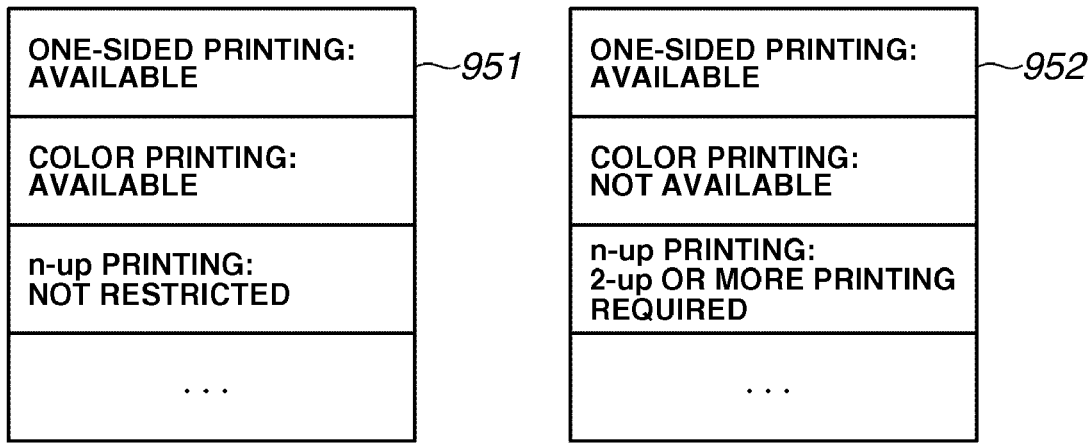

FIG.11
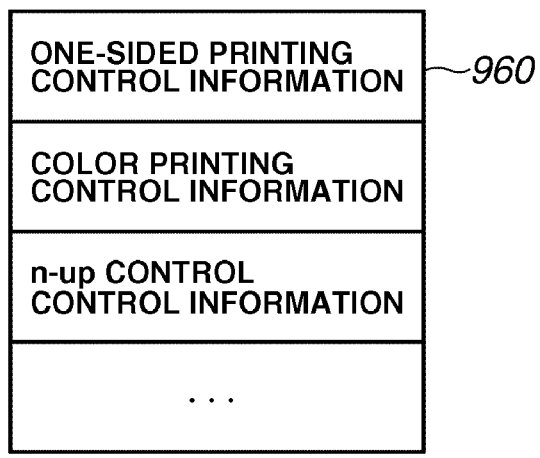
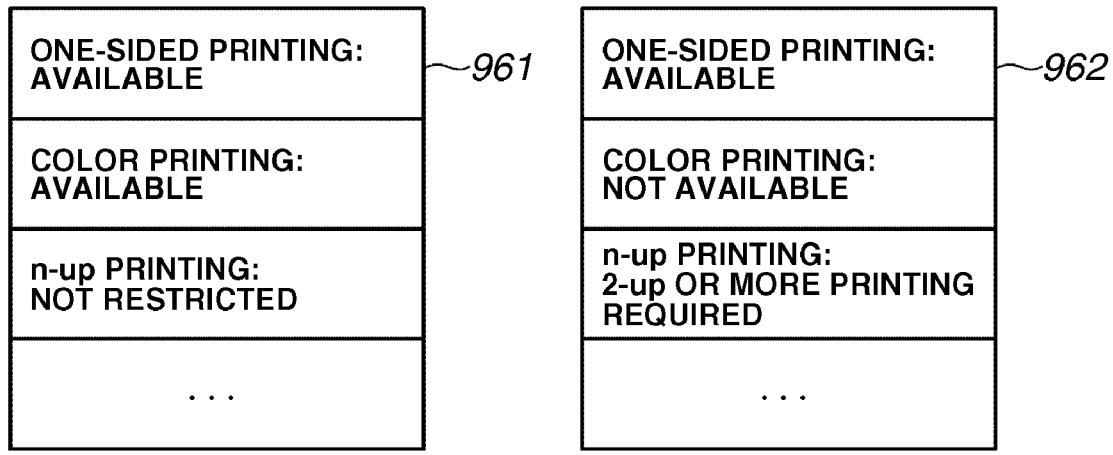

INFORMATION PROCESSING APPARATUS, INFORMATION PROCESSING METHOD, PERIPHERAL APPARATUS, AND AUTHORITY CONTROL SYSTEM

BACKGROUND OF THE INVENTION

1. Field of the Invention

The present invention relates to an information processing apparatus, an information processing method, a peripheral apparatus, and an authority control system capable of controlling a function provided by a peripheral apparatus such as a printing apparatus and a multifunction peripheral according to user's authority.

2. Description of the Related Art

When running costs of a printing apparatus and a printing system is calculated, total cost of ownership (TCO) including early installation costs, costs of consumables such as print papers and toner, and maintenance costs is considered. In recent years, TCO has attracted much attention in terms of reducing costs taken in a business scene, and the protection of environment.

In a business environment in which an image processing apparatus and a printing system are installed and are connected via a network installed in the office, a user who can access the network can perform arbitrary settings in printing.

Under such circumstances, in order to reduce the TCO, Japanese Patent Application Laid-Open No. 2005-032004 discusses a method in which when a user tries to make a number of prints exceeding an upper limit, a printing request exceeding the permitted number is cancelled.

Japanese Patent Application Laid-Open No. 2005-301602 discusses a method in which an access is controlled per each user with respect to printing of a document according to a policy generated considering combination of user's job title and a security level set for the document. Furthermore, in the method discussed by Japanese Patent Application Laid-Open No. 2005-301602, a permit for an access in preference to a policy can be given to enable user's exceptional access to a document.

Japanese Patent Application Laid-Open No. 2005-031784 discusses a method in which a print setting for color printing, monochromatic printing, and two-sided printing is controlled per each user.

When permission of printing is controlled per each user, in some cases, a user cannot print a document that the user desires to print. In such a case, the user on whom restriction is put in printing a document, requests an administrator who administers printing, to change the authority of the user, or requests another user on whom less restriction is put in printing of the document, to obtain a print product of the document for him.

However, in the conventional method described above, when a user cannot perform printing due to the restriction on the user's authority, it is necessary for an administrator to change user's print right or add a different setting that gives the user an exceptional print right, which causes an administrator to perform additional operation.

Meanwhile, in the case where the restricted user requests another user to perform printing of the document for him, in some cases, the document cannot be printed at a desired timing due to the convenience of another user who is requested to perform the printing.

Accordingly, considering the running costs of a printing apparatus, it is necessary not only to prevent a user from freely performing printing without being controlled but also provide a user with an exceptional authority of printing without causing an administrator to perform an exceptional setting for each user who has a limited printing authority.

SUMMARY OF THE INVENTION

The present invention is directed to an information processing apparatus, an information processing method, and an authority control system capable of flexibly providing a user with an authority to perform specific processing.

According to an aspect of the present invention, an information processing method in an information processing apparatus capable of acquiring access control information designated per each user for controlling a function provided by a peripheral apparatus includes: acquiring the access control information according to authorized user information included in certification information of a document; and sending processing information for allowing the peripheral apparatus to perform processing controlled according to the acquired control information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 5 illustrates a print right list managed by a print right list management database according to the first exemplary embodiment of the present invention.

FIG. 10 illustrates a print right list that the print control information generation server acquires from a print right list management database server according to the first exemplary embodiment of the present invention.

FIG. 11 illustrates primary control information included in the print control information that the printer driver acquires from the print control information generation server according to the first exemplary embodiment of the present invention.

DETAILED DESCRIPTION OF THE EXEMPLARY EMBODIMENTS

Various exemplary embodiments, features, and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

First Exemplary Embodiment

Figure 1:
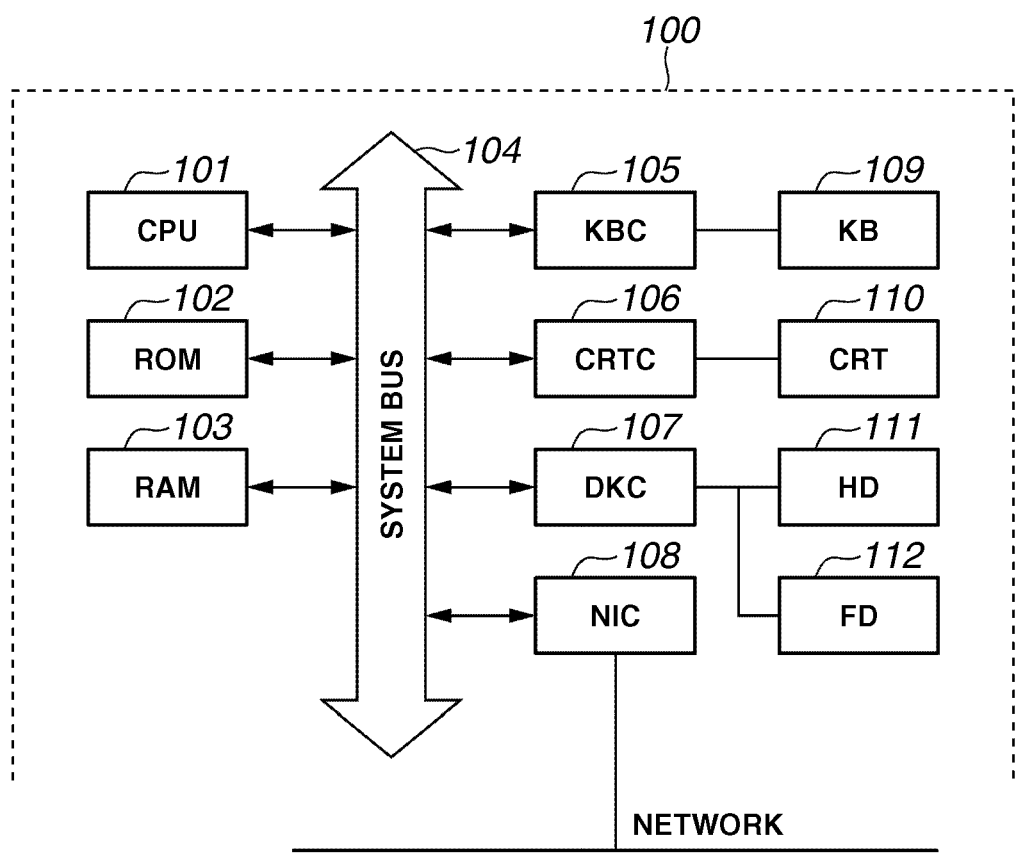
FIG. 1 illustrates a hardware configuration of a personal computer (PC) according to a first exemplary embodiment of the present invention.

Now, a first exemplary embodiment of the present invention will be described below. Referring to FIG. 1, a personal computer (PC) 100 includes a central processing unit (CPU) 101 that executes an application program supplied from a read only memory (ROM) 102, a hard disk (HD) 111, or a Floppy® disk (FD) 112.

The CPU 101 exercises control over devices in communication with one another via a system bus 104. The ROM 102 or the HD 111 stores a program illustrated in a flow of processing of FIGS. 12, 13, 14, and 15 which will be described below.

A random access memory (RAM) 103 functions as a main memory and a work area for the CPU 101.

A keyboard controller (KBC) 105 controls command input via a keyboard (KB) 109 and a pointing device (not shown).

A cathode ray tube controller (CRTC) 106 controls the display on a CRT display (CRT) 110.

A disk controller (DKC) 107 controls an access to the HD 111 and the FD 112 storing a boot program, a user file, an application program, and a network control program.

A network interface card (NIC) 108 is used for performing interactive data communication with a network device via a network. As the network, a local area network (LAN) and the Internet can be used.

In all the descriptions below, mainly, the CPU 101 performs processing according to the exemplary embodiments of the present invention unless otherwise noted, in terms of hardware configuration. Mainly, the application program installed on the HD 111 is used for performing processing according to the exemplary embodiments of the present invention, in terms of software configuration.

Figure 2:
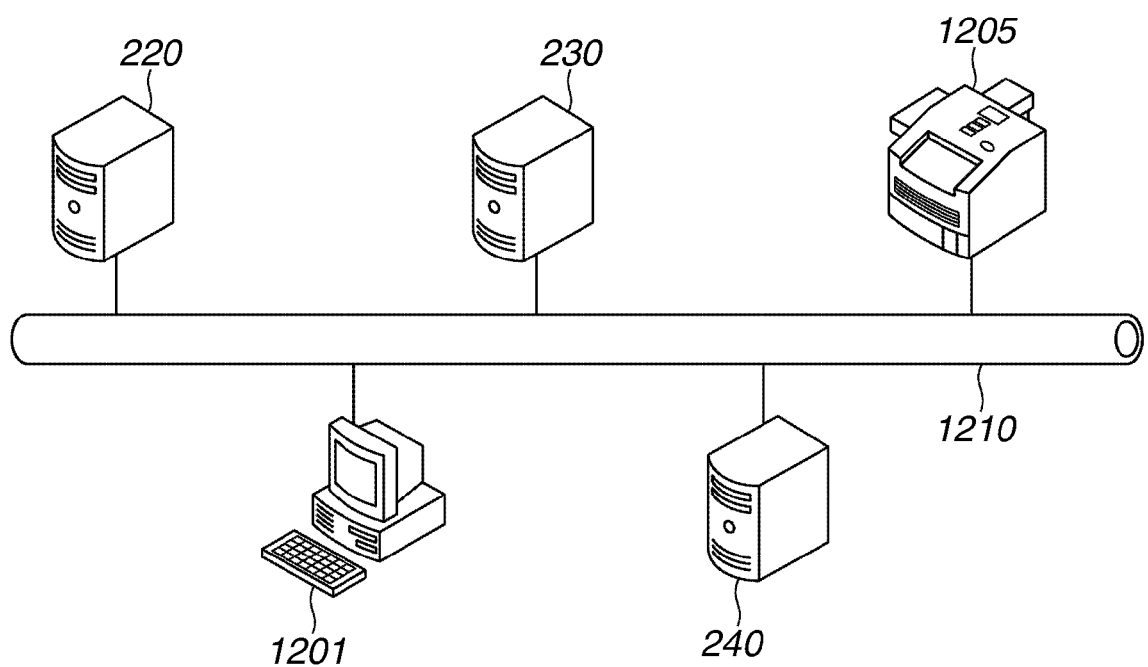
FIG. 2 illustrates a system configuration according to the first exemplary embodiment of the present invention.

FIG. 2 illustrates an exemplary system configuration according to the present embodiment.

Referring to FIG. 2, a client PC 1201 is installed with a printer driver 210, which is described below. The printer driver 210 sends a print job to an output device according to a print instruction from a user.

A print control information generation server 220 generates print control information in response to a print control information request from the printer driver 210. The print control information described in the present invention refers to control information related to print processing such as a print setting, among control information for controlling functions provided by a printing apparatus.

More specifically, the functions provided by a printing apparatus include a print function and a SEND function for sending image data via an E-mail. The control information refers to information for controlling such functions per each user.

A public key management server 230 manages and stores a public key per each user.

A print right list management database (DB) 240 manages print control information per each user.

A printing apparatus 1205 performs actual printing according to a print job. A peripheral device such as a copying machine and a multifunction peripheral can be used as the printing apparatus 1205.

Figure 3:
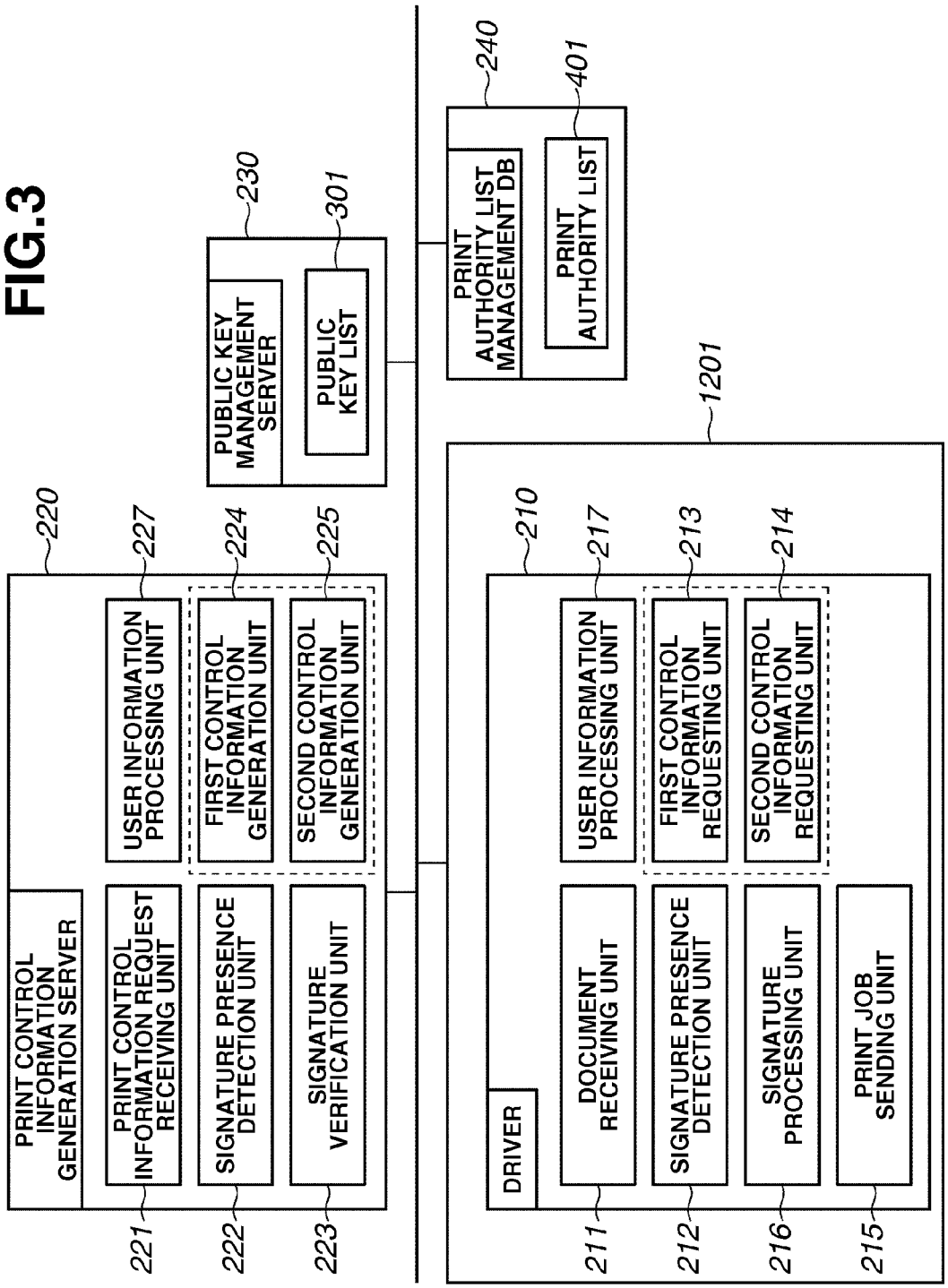
FIG. 3 illustrates a module structure in the system according to the first exemplary embodiment of the present invention.

FIG. 3 illustrates a module structure according to the present exemplary embodiment.

The printer driver 210 is installed on the client PC 1201 and includes a document receiving unit 211 and a signature presence detection unit 212. The document receiving unit 211 receives a document which is to be printed. The signature presence detection unit 212 detects presence or absence of a signature in a document. Furthermore, the printer driver 210 includes a signature processing unit 216 and a user information processing unit 217. The signature processing unit 216 extracts a signature from a document. The user information processing unit 217 acquires information about a user who performs printing.

Here, "instructing user information" includes information such as an identification (ID) and a name of a user for identifying an instructing user who has generated an instruction for printing. The instructing user information can include authority information about a user who performs printing.

In addition, the printer driver 210 includes a first control information requesting unit 213 and a second control information requesting unit 214. The first control information requesting unit 213 and the second control information requesting unit 214 send and receive a print control information request and print control information to and from the print control information generation server 220. Further, the printer driver 210 includes a print job sending unit 215 that sends a print job to an output device.

The present exemplary embodiment is not limited to the configuration in which two modules each separately perform processing according to the presence or absence of a signature. That is, the two modules, namely, the first control information requesting unit 213 and the second control information requesting unit 214, can be integrally installed on the printer driver 210 as one module.

The print control information generation server 220 includes a print control information request receiving unit 221, a signature presence detection unit 222, and a signature verification unit 223. The signature presence detection unit 222 detects presence or absence of a print control information request. The signature verification unit 223 performs processing for verifying authenticity of signatory information. In addition, the print control information generation server 220 includes a first control information generation unit 224, a second control information generation unit 225, and a user information processing unit 217.

The present exemplary embodiment is not limited to the configuration in which two modules each separately perform processing according to the presence or absence of a signature. That is, the two modules, namely, the first control information generation unit 224 and the second control information generation unit 225, can be integrally installed on the print control information generation server 220 as one module.

As illustrated in FIGS. 2 and 3, in the present exemplary embodiment, the print control information generation server 220, the public key management server 230, and the print right list management DB 240 are installed on different information processing apparatuses. However, the functions of the print right list management DB 240 can be installed on the print control information generation server 220.

That is, the functions of the print control information generation server 220, the public key management server 230, and the print right list management DB 240 can be installed on one information processing apparatus. In addition, in the present exemplary embodiment, the functions installed on the client PC 1201 can also be installed on the printing apparatus 1205.

In this case, the printing apparatus 1205 and the print control information generation server 220 communicate with each other to control the print functions according to print control information.

In the configuration of the present exemplary embodiment, the control information for controlling the print function and the SEND function provided by the printing apparatus can be acquired by communicating with the print control information generation server 220 and the control of the function can be performed per each user according to the received control information.

Figure 4:
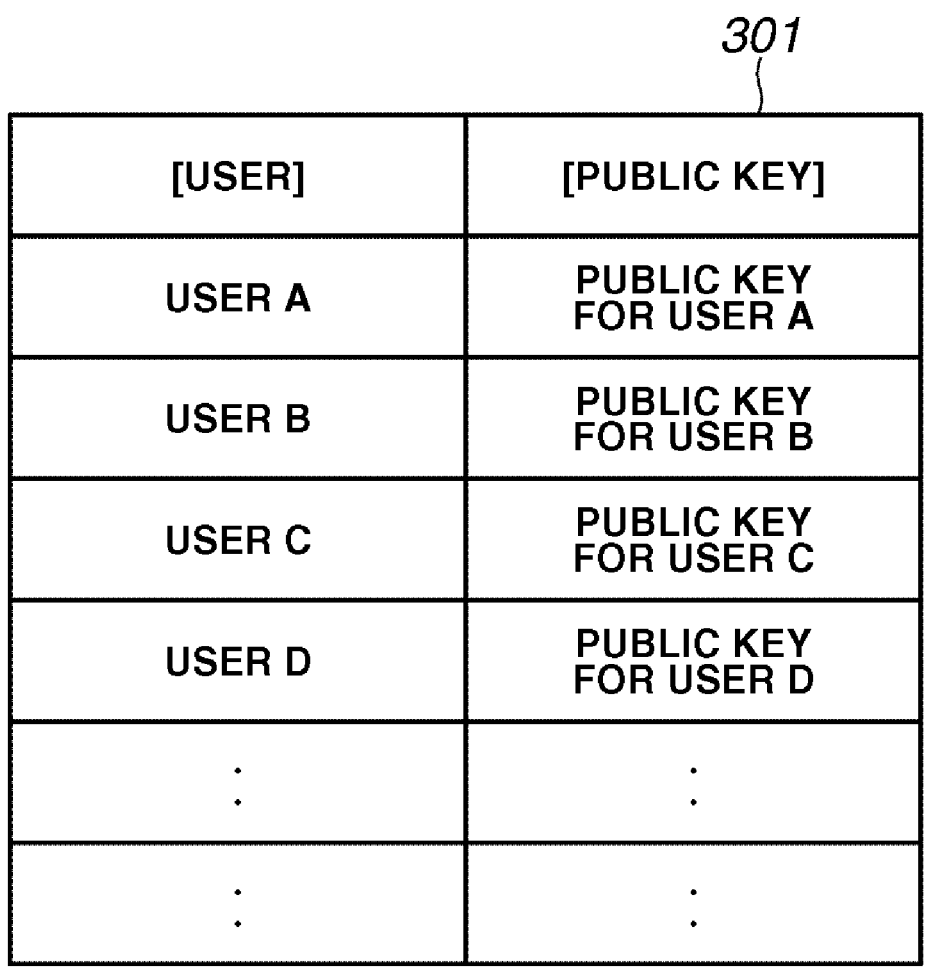
FIG. 4 illustrates a public key managed by a public key management server according to the first exemplary embodiment of the present invention.

The public key management server 230 manages a public key list 301 illustrated in FIG. 4. In the public key list 301, information about a user and a public key for a user are managed linked with each other. For example, in the present exemplary embodiment, a user A and a public key for the user A are managed linked with each other.

The print right list management DB 240 manages a print right list 401 illustrated in FIG. 5. In the print right list 401, information about a user and a print right of the user such as permission to perform color/monochromatic printing, one-sided/two-sided printing, and n-up printing are managed linked with each other.

For example, in the example illustrated in FIG. 5, the print right list 401 describes that the user A is permitted to perform both color printing and monochromatic printing, and is also permitted to perform both one-sided printing and two-sided printing. In addition, the user A is not restricted to performing n-up printing but is permitted to perform printing one page on one print paper.

Furthermore, in the example illustrated in FIG. 5, the print right list 401 describes that a user B is permitted to perform only monochromatic printing while he is permitted to perform both one-sided printing and two-sided printing. Moreover, for the user B, n-up printing has to be 2-up or more printing. That is, the user B is permitted to perform printing under a condition that two or more pages are printed on one print paper.

Figure 6:
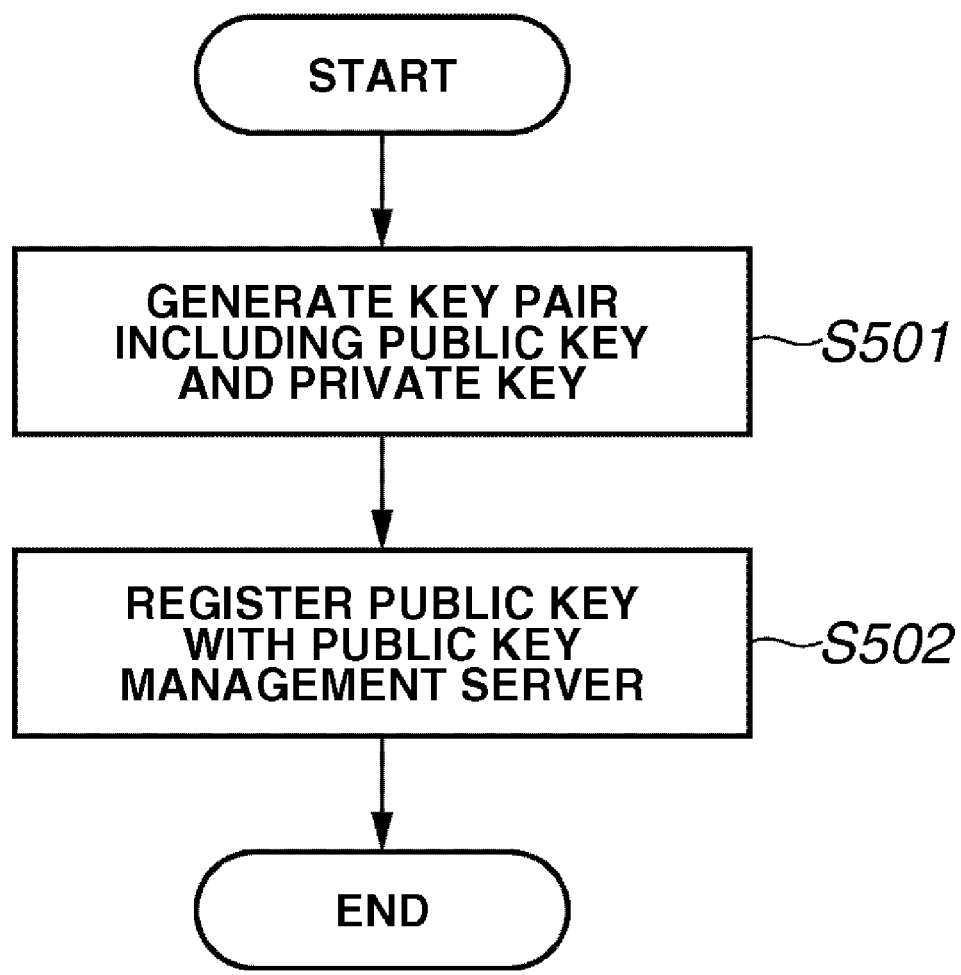
FIG. 6 is a flow chart illustrating processing for registering a public key according to the first exemplary embodiment of the present invention.

FIG. 6 is a flow chart illustrating processing for registering a public key in the public key management server 230 according to the present exemplary embodiment. In the present exemplary embodiment, it is assumed that the user registers a public key into the public key management server 230 from the client PC 1201 via a network.

Referring to FIG. 6, in step S501, the CPU 101 generates a key pair of the public key and a private key of the user by a key pair generation module (not shown).

In step S502, the CPU 101 registers the generated public key in the public key management server 230 together with the user information.

Figure 7:
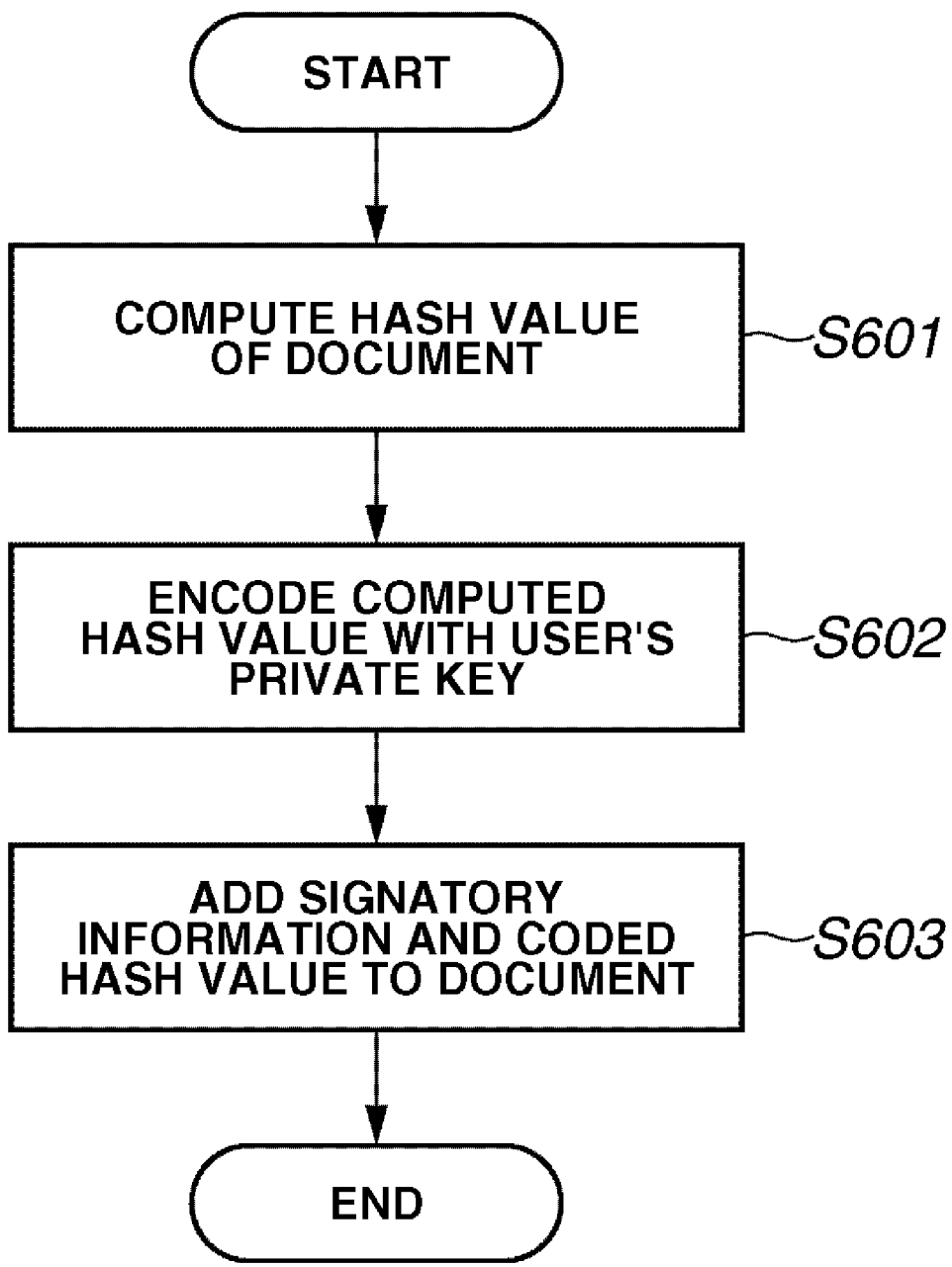
FIG. 7 is a flow chart illustrating a flow of processing for adding a signature to a document according to the first exemplary embodiment of the present invention.

FIG. 7 is a flow chart illustrating processing for adding a signature to a document according to the present exemplary embodiment. In the present exemplary embodiment, it is assumed that in generating a document previously, a person who generates the document adds a signature to the document with an arbitrary information processing apparatus (such as a PC) as certification information. For the signature, an electronic signature is used.

In the present exemplary embodiment, the authorization information includes authorized user information for allowing a user to print the document according to a print right of the person who has generated the document, or an administrator of the document.

Accordingly, signatory information refers to authorized user information. An authorized user can be a person who has generated a document or a group and an organization including a plurality of persons belonging to a division for managing documents.

In step S601, the CPU 101 computes a hash value of document data. The hash value of document data, which is described below, refers to a hash value computed in a hash value computation module (not shown) based on data of the document text.

In step S602, the CPU 101 encodes the computed hash value using a private key of the user.

In step S603, the CPU 101 adds the signatory information as a signature and the hash value coded in step S602 to the document.

The addition of a signature can also be applied to an XPS system supported by Windows® of Microsoft Corporation. In this case, the signature data according to the present invention is stored in an XPS package. The XPS package can store a document and data generated by a different application.

Figure 8:
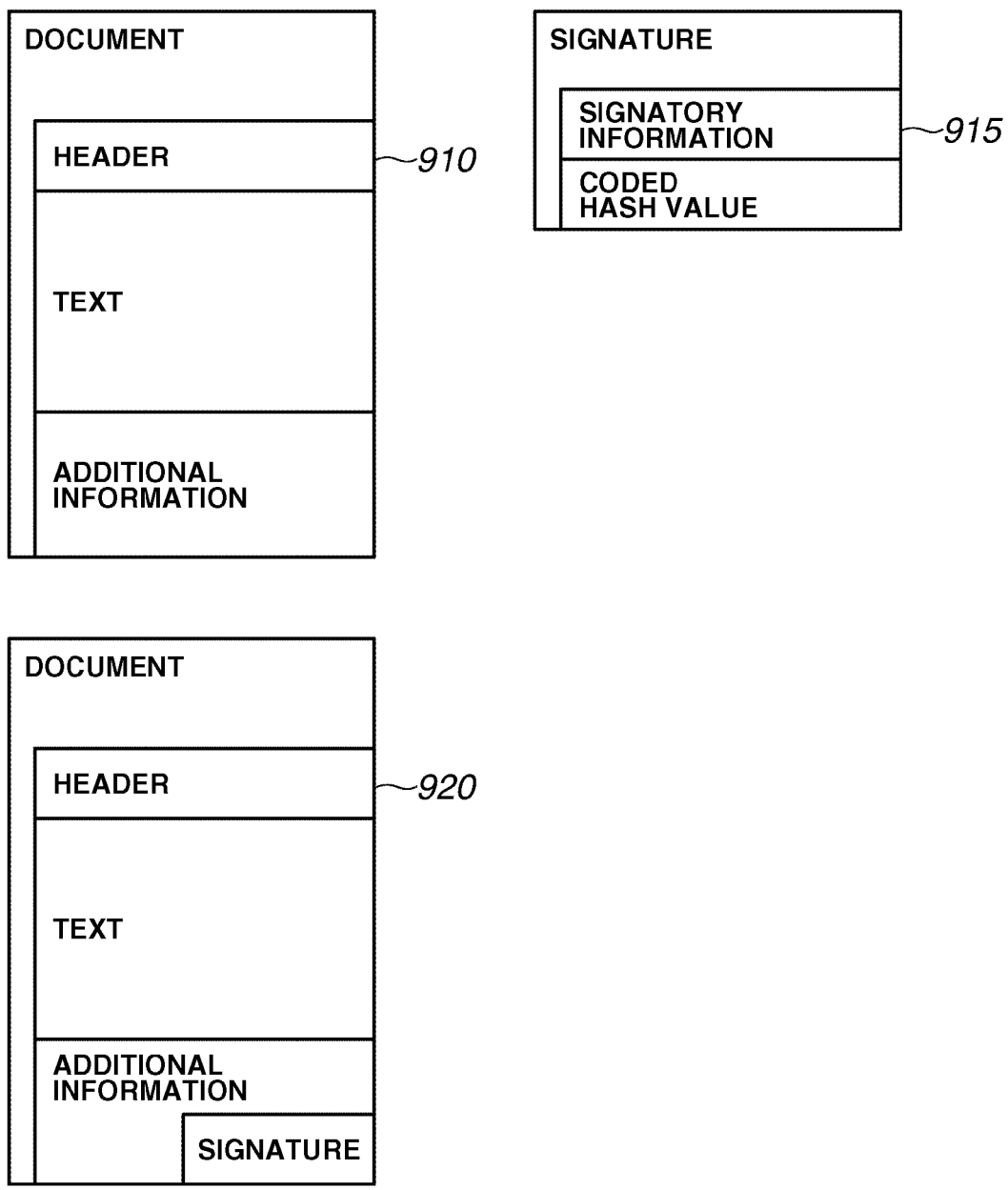
FIG. 8 illustrates a document, a signature, and a data format of a document with a signature that a printer driver receives according to the first exemplary embodiment of the present invention.

FIG. 8 illustrates a document, a signature, and a document including the signature that the printer driver 210 receives from the user according to the present exemplary embodiment.

Referring to FIG. 8, to a document 910 that the printer driver 210 receives from the user, no signature is added. The document 910 includes a document header, a document text, and additional document information.

The document according to the present exemplary embodiment is not limited to the configuration of the document 910 illustrated in FIG. 8.

A signature 915 is added to the document. The signature 915 includes signatory information and the hash value of the document data coded with the private key for the signatory, to authenticate the signatory who has signed the document 910.

In the present exemplary embodiment, a hash function is applied to data of the document text. The hash function is used as a method for computing a characteristic amount. In the present exemplary embodiment, the hash function is used as a method for certifying authenticity of a signature. However, the present invention is not limited to this method.

A signature-added document 920 is generated by adding the signature 915 to the non-signature-added document 910. The printer driver 210 receives the signature-added document 920 from the user.

Figure 9:
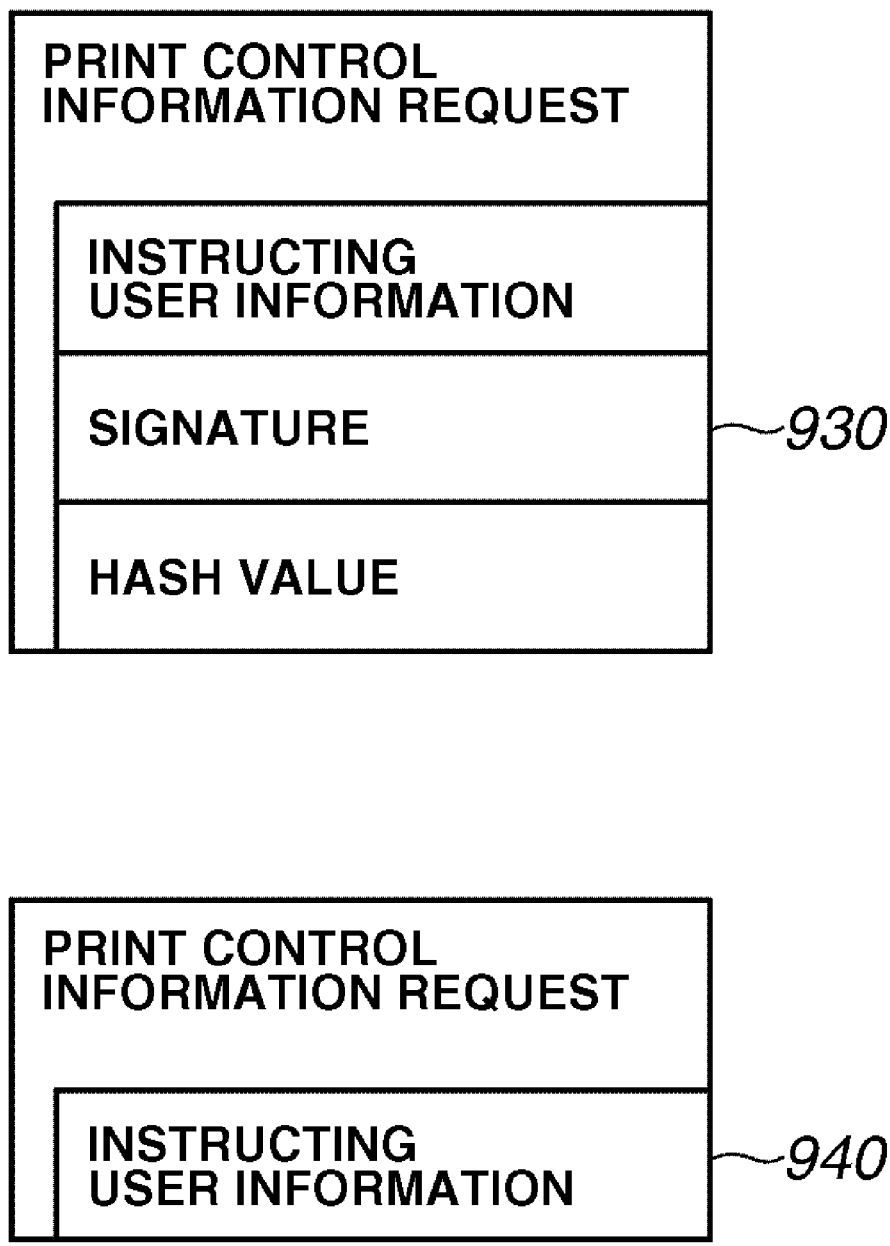
FIG. 9 illustrates a content of primary data included in print control information request sent from the printer driver to a print control information generation server according to the first exemplary embodiment of the present invention.

FIG. 9 illustrates data included in a print control information request sent from the printer driver 210 to the print control information generation server 220 according to the present exemplary embodiment.

A print control information request 930 includes instructing user information, a signature, and a hash value for document data. A print control information request 940 does not include a signature but includes instructing user information.

In the present exemplary embodiment, the print control information generation server 220 analyzes a print control information request to detect whether instructing user information, a signature, and a hash value of document data exist.

FIG. 10 illustrates a print right list that the print control information generation server 220 acquires from the print right list management DB 240 according to the present exemplary embodiment.

A print right list 950 describes primary information in the print control list that the print control information generation server 220 acquires from the print right list management DB 240.

A print right list 951 is an authority list for the user A generated according to the print right list 401 illustrated in FIG. 5. The print right list 951 describes that the user A is permitted to perform both color printing and monochromatic printing and both one-sided printing and two-sided printing and no restriction is put on setting of n-up printing.

A print right list 952 is an authority list for the user B generated according to the print right list 401 illustrated in FIG. 5, just as in the case of the print right list 951. The print right list 952 describes that the user B is permitted only to perform monochromatic printing, that the user B is permitted to perform both one-sided printing and two-sided printing, and n-up printing has to be 2-up or more printing, that is, the user B is permitted to perform printing in a setting where two or more pages are printed on one print paper.

FIG. 11 illustrates print control information that the printer driver 210 acquires from the print control information generation server 220 according to the present exemplary embodiment.

Print control information 960 is primary information in the print control information sent from the print control information generation server 220 to the printer driver 210. The print control information is generated under the restriction set in a print right list illustrated in FIG. 10.

At the time of actual printing, the print setting is controlled under the restriction of the print control information. The print control information is not limited to the control related to the print setting. That is, the print control information can be information for controlling the function provided by a printing apparatus such as the print function and the SEND function Print control information 961 corresponds to the print right list 951 for the user A. In the example illustrated in FIG. 11, the print control information 961 describes that the user A is permitted to perform both color printing and monochromatic printing, that the user A is permitted to perform both one-sided and two-sided printing, and that the user A is not restricted to perform a setting as to n-up printing.

Print control information 962 corresponds to the print right list 952 for the user B. In the example illustrated in FIG. 11, the print control information 962 describes that the user B is permitted to perform only monochromatic printing, but is permitted to perform both one-sided and two-sided printing, and that n-up printing has to be 2-up or more printing.

Now, the first exemplary embodiment of the present invention will be described in more detail with reference to FIG. 12 and FIG. 13. In the present exemplary embodiment, the signatory and the instructing user correspond to the user A and the user B in FIG. 4 and FIG. 5 respectively.

The processing by the printer driver 210 according to the first exemplary embodiment will be described below using the flow chart of processing executed by the CPU 101 in FIG. 12. Here, the processing performed by the printer driver 210 will be described in detail, from a step in which the printer driver 210 requests the print control information generation server 220 to send print control information according to an instruction for printing by the user, to a step in which the printer driver 210 sends a print job to the printing apparatus according to the generated print control information.

Figure 12:
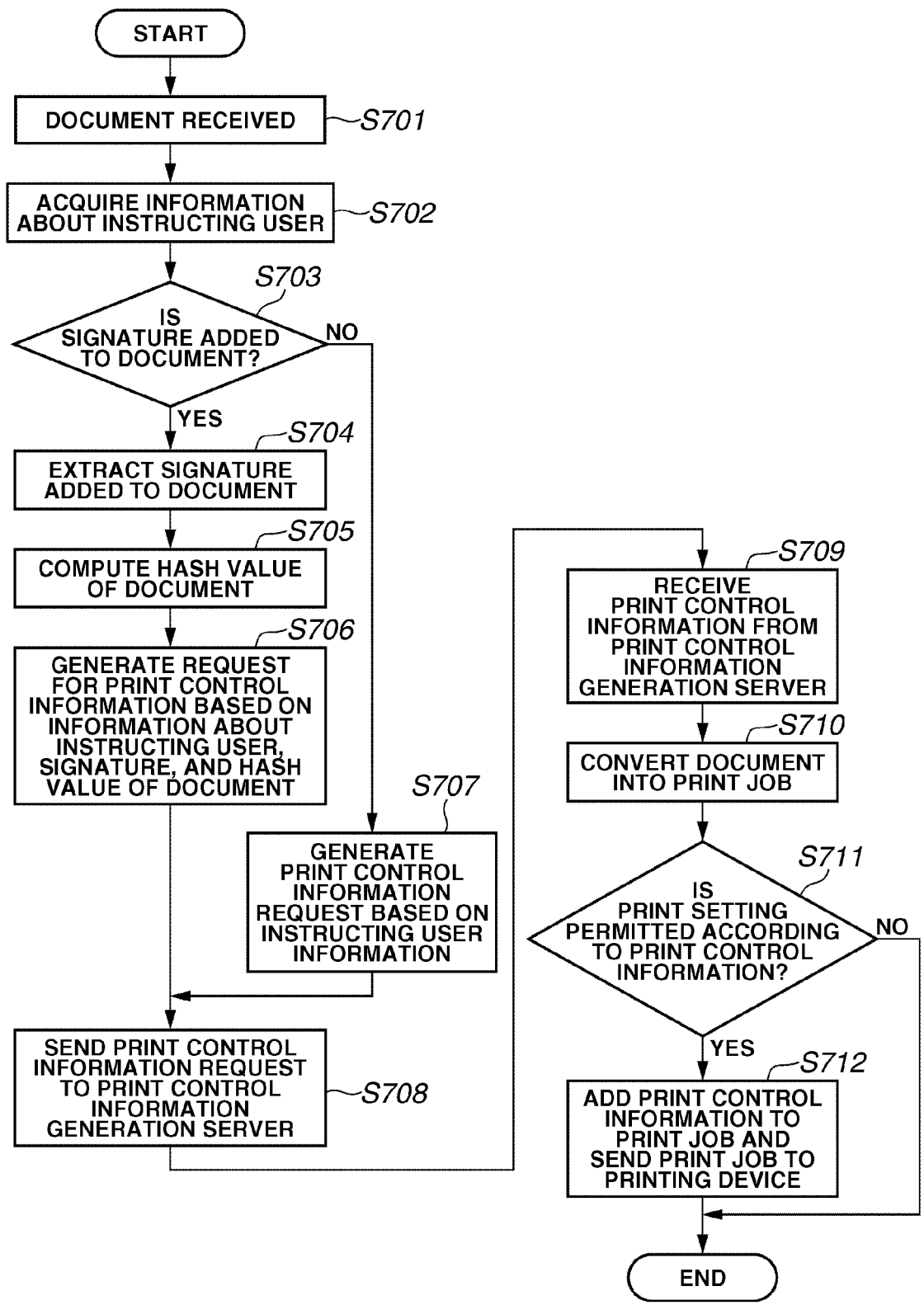
FIG. 12 is a flow chart illustrating processing performed by a printer driver 210 for generating a print job according to the first exemplary embodiment of the present invention.

Referring to FIG. 12, in step S701, the document receiving unit 211 of the printer driver 210 receives a document that the user desires to print. As the document that the printer driver 210 receives, the user can designate a document stored in a storage area in the client PC 1201 or a document received via an E-mail via a network 1210 (FIG. 2).

In addition, the user can designate a document via a personal digital assistant and an external storage medium including a notebook computer via a universal serial bus (USB) interface (not shown).

In step S702, the user information processing unit 217 acquires information about the user who has instructed printing. In the present exemplary embodiment, the user information processing unit 217 identifies and acquires information about the user who has instructed printing, from the document to be printed.

The present invention is not limited to the above-described method for acquiring user information. That is, the user information processing unit 217 can directly acquire information entered by the user via the client PC 1201. In the present exemplary embodiment, the instruction described in the instructing user information is not limited to print instruction. That is, the instruction includes an instruction for performing processing that can be controlled according to print control information, such as the SEND processing performed by a printing apparatus.

In step S703, the signature presence detection unit 212 detects whether a signature is added to the document. If it is detected in step S703 that a signature is added to the document, then the printer driver 210 advances to step S704. On the other hand, if it is detected in step S703 that no signature is added to the document, then the printer driver 210 shifts to step S707.

In step S704, the signature processing unit 216 extracts the signature added to the document, and the printer driver 210 acquires the signature from the document.

In step S705, the signature processing unit 216 computes a hash value of the document data.

In step S706, the first control information requesting unit 213 generates a print control information request, and then the printer driver 210 advances to step S708. Here, the print control information request is generated based on the instructing user information acquired in step S702, the signature extracted in step S704, and the hash value of document data computed in step S705.

More specifically, the print control information request is the print control information request 930 illustrated in FIG. 9 including instructing user information, a signature, and a hash value.

In step S707, the second control information requesting unit 214 generates a print control information request based on the instructing user information acquired in step S702, and then the printer driver 210 advances to step S708. Here, the print control information request is the print control information request 940 illustrated in FIG. 9, which includes only the instructing user information.

The processing in step S708 and step S709 is performed in common by the first control information requesting unit 213 and the second control information requesting unit 214. The processing described below is performed in response to and according to a print control information request and the print control information sent and received between the printer driver 210 and the print control information generation server 220.

The processing for generating print control information by the print control information generation server 220 will be described below with reference to a flow chart of processing illustrated in FIG. 13 described later.

In step S708, the first control information requesting unit 213 or the second control information requesting unit 214 sends the print control information request 930 or the print control information request 940 generated in step S706 or step S707 to the print control information generation server 220.

In step S709, the first control information requesting unit 213 or the second control information requesting unit 214 receives print control information from the print control information generation server 220 in response to the print control information request generated in step S708. In the above-described configuration, the printer driver 210 acquires print control information.

In step S710, the print job sending unit 215 converts the document received in step S701 into a print job according to the print setting instructed by the user. In converting the document into a print job, the document data is converted into page description language (PDL) data.

In step S711, the printer driver 210 cancels the print job if the print setting instructed by the user is not the print setting permitted to the user according to the acquired print control information. Here, the printer driver 210 can notify the user to perform a print instruction again to generate a right print instruction via the CRT 110.

In step S712, the print job sending unit 215 adds the print control information received in step S709 to the print job generated in step S710, and sends the print job to the printing apparatus 1205. With respect to a printing apparatus that can directly process a document, which is described below in a third exemplary embodiment of the present invention, the printing apparatus can send the document and the control information at the same time.

Here, the print job to which the print control information is added, the document, and the control information are sent as processing information that allows the printing apparatus 1205 to perform restricted processing.

In the present exemplary embodiment, when the print setting instructed by the user in step S711 is not permitted according to the print control information, the printer driver 210 cancels the print job. In this case, the printer driver 210 can re-generate a print job by automatically changing the print setting within the scope permitted according to the print control information.

Here, the print job generated by the printer driver 210 according to the control information is sent as processing information that allows the printing apparatus 1205 to perform restricted processing.

The printing apparatus 1205 includes an inner hardware configuration illustrated in FIG. 16 and FIG. 17 which are described below. The print job illustrated in step S711 is received by the printing apparatus 1205. Then, the received print job is processed in a control information processing unit 1407 and an image data generation unit 1404 to be finally printed and output by an engine unit 1406, according to the print setting set according to the print control information.

When image data is generated which is output by the engine unit, the control information processing unit 1407 verifies the print control information by accessing the print control information generation server 220 and the print right list management DB 240. After that, according to the verified print control information, the printing apparatus 1205 detects whether the print setting is permitted in the control information processing unit 1407. If the print setting is permitted according to the print control information, then the printing apparatus 1205 prints and outputs the image data.

On the other hand, if it is detected that the print setting is restricted according to the print control information, then the printing apparatus 1205 cancels printing and outputting of the image data. In the above-described configuration, the print setting can be controlled per each user with respect to print modes such as color printing.

In the present exemplary embodiment, the print control information is added to a print job that is sent to the printing apparatus. However, the present invention is not limited to this. That is, if a printing apparatus cannot perform control processing related to a document according to the control information, the printer driver 210 can previously generate a print job which is printed in a restricted print setting according to the print control information and send the generated print job to the printing apparatus 1205.

In this case, a print job that does not include control information is sent to the printing apparatus 1205. Here, the printing apparatus 1205 can obtain a desired print output only by performing the received print job, via a receiving unit 1402 for receiving a print job, the image data generation unit 1404, and the engine unit 1406 and by outputting the print job.

That is, the processing performed according to control information can be performed by a printing apparatus that does not include a component for performing processing related to specific control information such as the control information processing unit 1407 illustrated in FIG. 17 described below.

Now, the processing performed by the print control information generation server 220 according to the first exemplary embodiment will be described with reference to a flow chart of processing according to the program executed by the CPU 101 in FIG. 13. Here, the processing is described which is performed by the print control information generation server 220 in response to the print control information request from the printer driver 210 and the generated print control information is sent to the printer driver 210.

Figure 13:
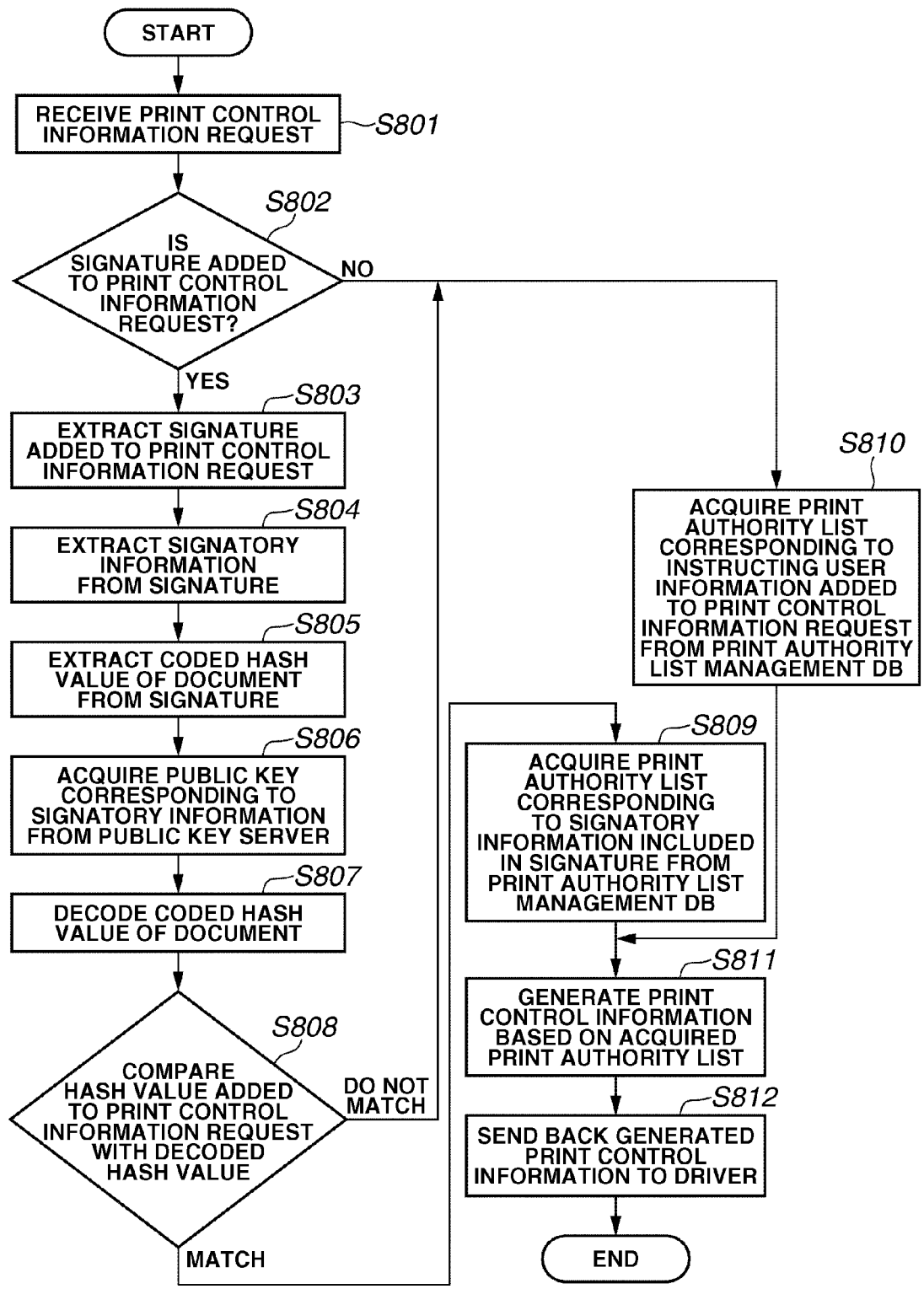
FIG. 13 is a flow chart illustrating processing performed by a print control information generation server 220 for generating print control information according to the first exemplary embodiment of the present invention.

Referring to FIG. 13, in step S801, the print control information request receiving unit 221 of the print control information generation server 220 receives the print control information request 930 or the print control information request 940 from the printer driver 210.

In step S802, the signature presence detection unit 222 detects whether a signature is added to the print control information request received in step S801. If the print control information request includes a signature, then the process advances to step S803. On the other hand, if the print control information request includes no signature, then the process shifts to step S810.

In step S803, the signature verification unit 223 extracts the signature from the print control information request 930 received in step S801.

In step S804, the signature verification unit 223 extracts signatory information from the signature extracted in step S803.

In step S805, the signature verification unit 223 extracts the coded hash value of the document data from the signature extracted in step S803.

In step S806, the signature verification unit 223 acquires a public key corresponding to the extracted signatory information from the public key management server 230.

In step S807, the signature verification unit 223 decodes the coded hash value of the document data extracted in step S805 with the public key corresponding to the signatory information acquired in step S806.

In step S808, the signature verification unit 223 collates the hash value of document data included in the print control information request 930 received in step S801 with the hash value decoded in step S807. If it is detected that the hash values match with each other, then the printer driver 210 advances to step S809. On the other hand, if it is detected that the hash value do not match with each other, then the printer driver 210 advances to step S810.

Here, if it is detected that the hash values match with each other, the authenticity of the signature included in the print control information request 930 is certified.

In step S809, the first control information generation unit 224 acquires the print right list 950 corresponding to the signatory information extracted in step S804 from the print right list management DB 240.

The processing in step S810 is performed in the case where it is detected that no signature is added to the print control information request in step S802 or where it is detected by the signature verification unit 223 that the signature for the print control information request is not authentic. First, the user information processing unit 227 extracts instructing user information from the print control information received in step S801.

Then, the second control information generation unit 225 acquires the instructing user information from the user information processing unit 227 and acquires the print right list 952 corresponding to the acquired instructing user information from the print right list management DB 240.

Hereinbelow, the processing in steps S811 and S812 is performed in common by the first control information generation unit 224 and the second control information generation unit 225.

In step S811, the first control information generation unit 224 or the second control information generation unit 225 generates the print control information 961 or 962 based on the print right list 951 or the print right list 952 acquired in step S809 or step S810.

In step S812, the first control information generation unit 224 or the second control information generation unit 225 sends the print control information 961 or the print control information 962 generated in step S811 to the printer driver 210.

In the present exemplary embodiment, it is assumed as an example that an application form to be submitted to an administrative body is printed. When a user has an authority which permits only two-sided printing or 2-up or more printing, in some cases, the user cannot satisfy a regulation of a document format specified by the administrative body in submitting the application form.

Here, the description will be made in more detail considering the users A and B illustrated in FIG. 5.

In the case where the user B prints the application form document that needs to be output in color printing and one-sided printing, the user B cannot perform the printing with the desired setting according to the print right list 952.

Thus, the user A who has previously registered the public key with the public key management server 230, puts an electronic signature on the application form document. Then, the user B sends the singed document to the printer driver 210 and instructs the printing of the document.

In the present exemplary embodiment, as described with reference to FIGS. 12 and 13, the user B can perform printing according to the print authority of the signatory (i.e., the user A). Thus, the user B can print the application form document in the desired setting.

In the case where the document is provided with a signature and the document is printed under the authority of the signatory, a notification to that effect can be indicated to the user via a display on the client PC 1201.

In the present exemplary embodiment, the document is subjected to checking as to presence or absence of a signature. If the document includes no signature, printing is performed in the print setting permitted by the authority of the user who has instructed the printing.

Furthermore, in the case where the signature provided to the document is not authentic, the document is printed in the print setting permitted by the authority of the user who has instructed the printing. In this case, a message indicating that the signature is not authentic can be notified to the user who has instructed the printing via the display on the client PC 1201 or a display unit of the printing apparatus 1205.

In the present exemplary embodiment, an electronic signature is put on the document. However, the method for adding certification information to the document is not limited to the method using an electronic signature.

Second Exemplary Embodiment

Now, a second exemplary embodiment will be described below. The second exemplary embodiment is different from the first exemplary embodiment in that the main unit for computing a hash value of document data is the print control information generation server 220 instead of the printer driver 210. Thus, in the case where a document is provided with a signature, the print control information generated by the printer driver 210 is generated according to the instructing user information, the signature, and the document. This is another point different from the second exemplary embodiment.

Now, processing performed by the printer driver 210 according to the second exemplary embodiment will be described below with reference to a flow chart of processing performed according to the program executed by the CPU 101 in FIG. 14

Figure 14:
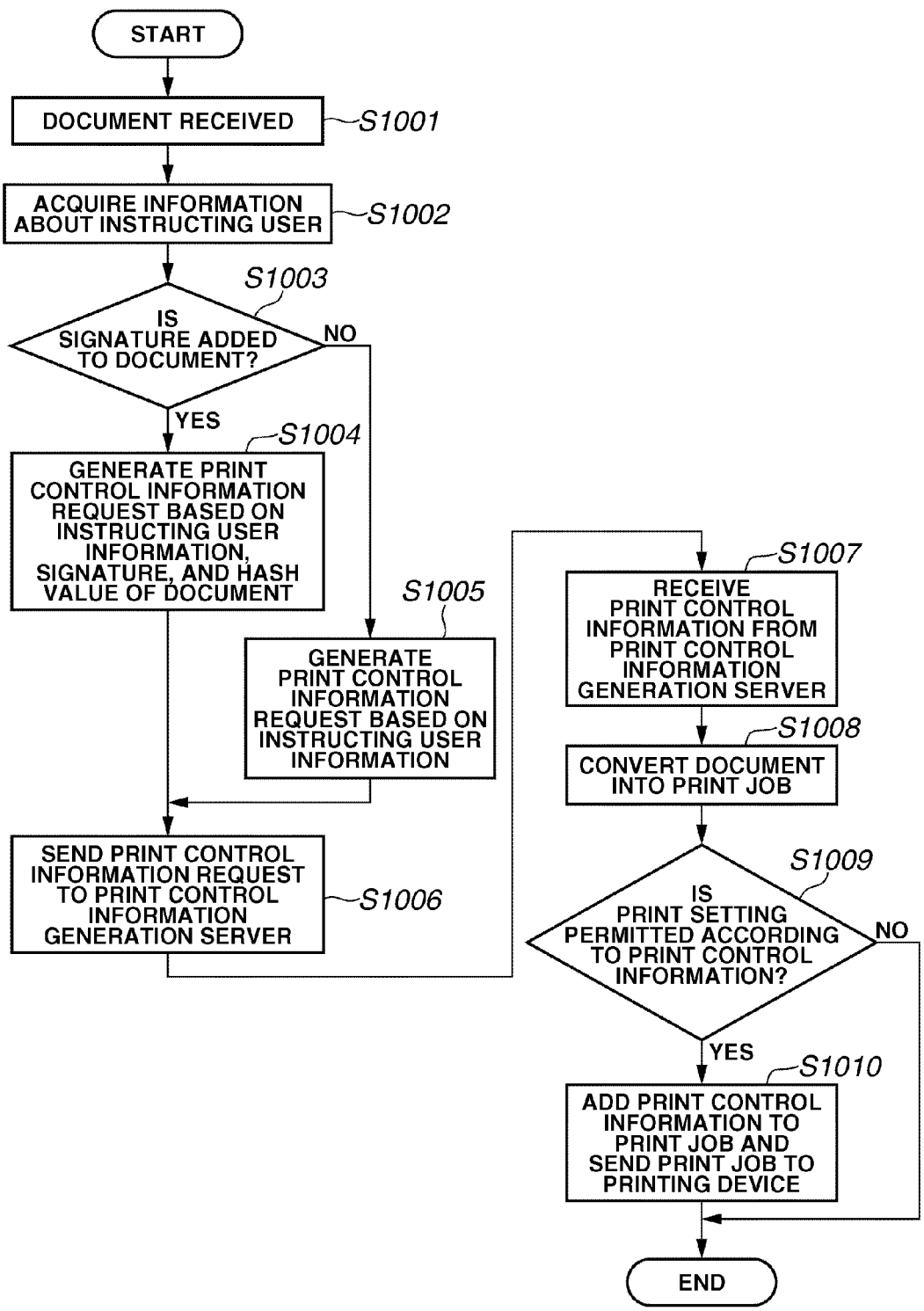
FIG. 14 is a flow chart illustrating a flow of processing performed by the printer driver 210 for generating a print job according to the exemplary embodiment of the present invention.

Referring to FIG. 14, in step S1001, the document receiving unit 211 of the printer driver 210 receives a document from the user.

In step S1002, the user information processing unit 217 acquires information about the instructing user who has instructed the printing. In the present exemplary embodiment, the user information processing unit 217 identifies and acquires information about the user who has instructed printing, from the document to be printed.

A method for acquiring the instructing user information according to the present invention is not limited to the above-described method. That is, the instructing user information processing unit 217 can directly acquire information entered by the user via the client PC 1201.

In step S1003, the signature presence detection unit 212 detects whether a signature is added to the document. If a signature is added to the document, then the printer driver 210 advances to step S1004. On the other hand, if no signature is added to the document, then the printer driver 210 advances to step S1007.

In step S1004, the signature processing unit 216 extracts the signature added to the document, and the first control information requesting unit 213 generates a print control information request according to the instructing user information, the signature, and the document.

In step S1005, the second control information requesting unit 214 generates a print control information request based on the instructing user information.

The processing performed in step S1006 and step S1007 is performed in common by the first control information requesting unit 213 and the second control information requesting unit 214.

In step S1006, the first control information requesting unit 213 or the second control information requesting unit 214 sends the print control information request generated in step S1004 or step S1005 to the print control information generation server 220.

In step S1007, the first control information requesting unit 213 or the second control information requesting unit 214 receives print control information from the print control information generation server 220 in response to the print control information request.

In step S1008, the print job generating unit 215 converts the document received in step S1007 into a print job according to the print setting instructed by the user. In converting the document into a print job, the document data is converted into page description language (PDL) data.

In step S1009, the printer driver 210 cancels the print job if the print setting instructed by the user is not permitted to the user according to the acquired print control information. Here, the printer driver 210 can notify the user to issue a print instruction again via the CRT 110.

In step S1010, the print job sending unit 215 adds the print control information received in step S1007 to the print job generated in step S1008, and sends the print job to which the print control information is added, to the printing apparatus 1205. With respect to a printing apparatus that can directly process a document, which is described below in a third exemplary embodiment of the present invention, the printing apparatus can send the document and the control information at the same time.

Here, the print job to which the print control information is added, the document, and the control information are sent as processing information which allows the printing apparatus 1205 to perform restricted processing.

In the present exemplary embodiment, when the print setting instructed by the user in step S711 is not permitted according to the print control information, the printer driver 210 cancels the print job. In this case, the printer driver 210 can re-generate a print job by automatically changing the print setting within the scope permitted according to the print control information.

Here, the print job generated by the printer driver 210 according to the control information is sent as processing information which allows the printing apparatus 1205 to perform restricted processing.

The printing apparatus 1205 includes an inner hardware configuration illustrated in each of FIG. 16 and FIG. 17 which is described below. The print job illustrated in step S1009 is received by the printing apparatus 1205. Then, the received print job is processed via a control information processing unit 1407 and an image data generation unit 1404 to be finally printed and output by an engine unit 1406, according to the print setting set according to the print control information.

When image data to be output by the engine unit is generated, the control information processing unit 1407 verifies the print control information by accessing the print control information generation server 220 and the print right list management DB 240. After that, the printing apparatus 1205 detects whether the print setting is permitted according to the print control information in the control information processing unit 1407. If the print setting is permitted according to the print control information, then the printing apparatus 1205 prints and outputs the image data.

In the present exemplary embodiment, the print control information is added to a print job which is sent to the printing apparatus. However, the present invention is not limited to this embodiment. That is, the printer driver 210 can previously generate a print job to be printed in a restricted print setting according to the print control information and send only the generated print job to the printing apparatus 1205. In this case, a print job that does not include control information is sent to the printing apparatus 1205.

In this case, the printing apparatus 1205 can obtain a desired print output only by performing the print job received via a unit 1402 for receiving a print job, the image data generation unit 1404, and the engine unit 1406 and by outputting the print job. That is, the processing can be performed according to the control information by a printing apparatus that does not include a component for performing processing related to specific control information such as the control information processing unit 1407 illustrated in FIG. 17 which is described below.

Now, the processing performed by the print control information generation server 220 according to the second exemplary embodiment will be described with reference to a flow chart of processing according to the program executed by the CPU 101 in FIG. 15.

Figure 15:
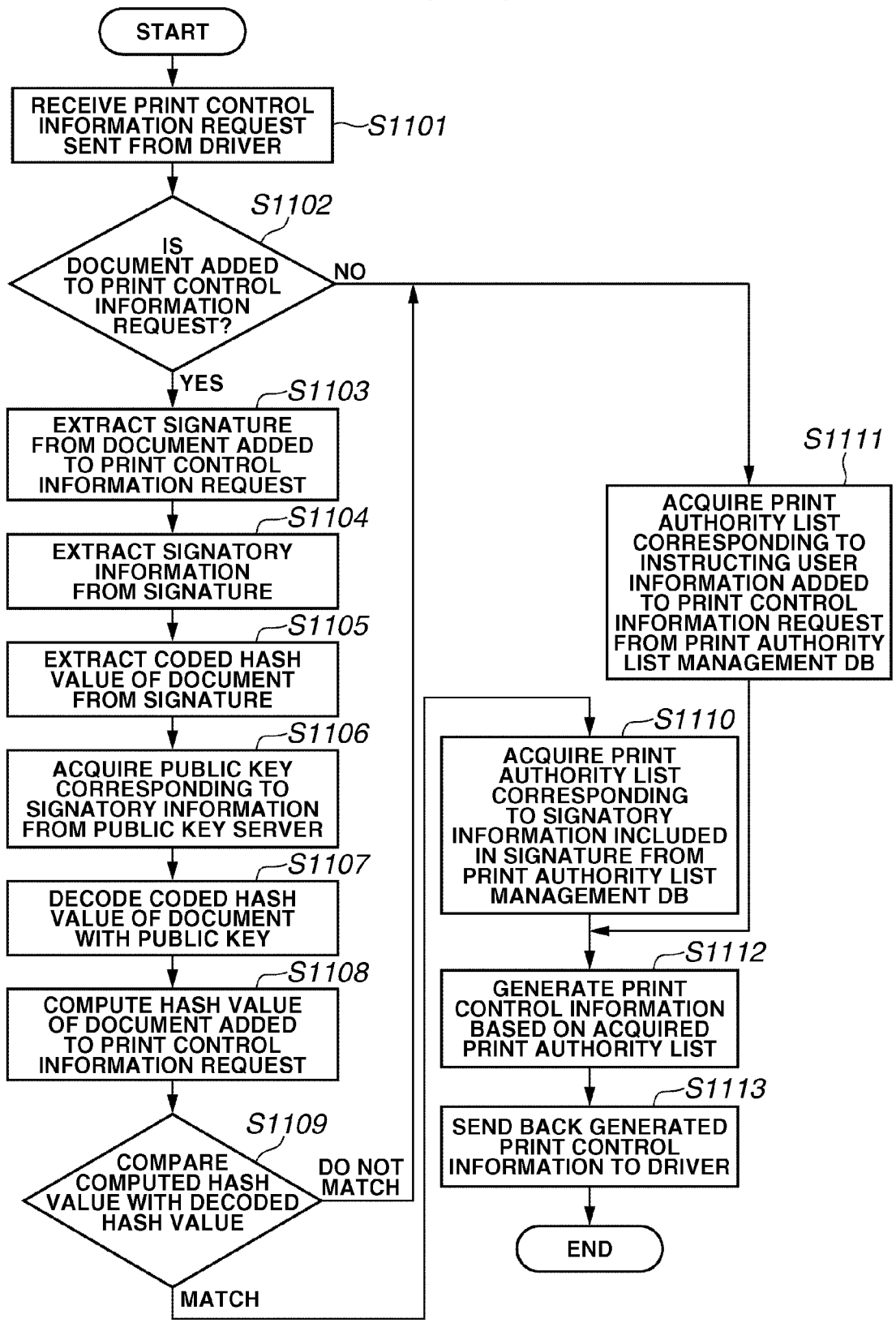
FIG. 15 is a flow chart illustrating processing performed by the print control information generation server 220 for generating print control information according to a second exemplary embodiment of the present invention.

Referring to FIG. 15, in step S1101, the print control information request receiving unit 221 of the print control information generation server 220 receives the print control information request sent from the printer driver 210.

In step S1102, the signature presence detection unit 222 detects whether a signature is added to the print control information request received in step S1101. If, as a result of the detection in step S1102, the print control information request includes a signature, then the process advances to step S1103. On the other hand, if the print control information request includes no signature, then the process advances to step S1111.

In step S1103, the signature verification unit 223 extracts a signature from the print control information request received in step S1101.

In step S1104, the signature verification unit 223 extracts signatory information from the signature extracted in step S1103.

In step S1105, the signature verification unit 223 extracts the coded hash value of document data from the signature extracted in step S1103.

In step S1106, the signature verification unit 223 acquires a public key corresponding to the extracted signatory information from the public key management server 230.

In step S1107, the signature verification unit 223 decodes the coded hash value of the document data extracted in step S1105, with the public key corresponding to the signatory information acquired in step S1106.

In step S1108, the signature verification unit 223 computes the hash value of the document data added to the print control information request.

In step S1109, the signature verification unit 223 collates the hash value of the document data computed in step S1108 with the hash value decoded in step S1107. If, as a result of the collation in step S1109, the hash values match with each other, then the process advances to step S1110. On the other hand, if the hash values do not match with each other, then the process advances to step S1111.

In step S1110, the first control information generation unit 224 acquires the print right list corresponding to the signatory information extracted in step S1104 from the print right list management DB 240.

The processing in step S1111 is performed in the case where it is detected that no document is added to the print control information request as a result of the detection in step S1102 or where it is detected as a result of the collation in step S1109 that the signature is not authentic.

First, the user information processing unit 227 extracts instructing user information from the print control information received in step S1101. Then, the second control information generation unit 225 acquires the print right list corresponding to the instructing user information from the print right list management DB 240.

In step S1112, the first control information generation unit 224 or the second control information generation unit 225 generates the print control information based on the print right list acquired in step S1110 or step S1111.

In step S1113, the first control information generation unit 224 or the second control information generation unit 225 sends back the print control information generated in step S1112 to the printer driver 210.

In the second exemplary embodiment, the print control information generation server 220 computes the hash value of the document data. Thus, verifying and authenticating the signature can be completed within the print control information generation server 220. Accordingly, the security against manipulation of a document can be improved.

Third Exemplary Embodiment

Now, a third exemplary embodiment of the present invention will be described below. In the present exemplary embodiment, it is assumed that the user generates an instruction not via the client PC 1201 but via the printing apparatus 1205. In addition, it is assumed that when the printing apparatus 1205 uses the function such as the print function and the SEND function, the printing apparatus 1205 performs the processing according to the control information.

Now, a configuration of hardware and a module installed on the printing apparatus 1205 will be described with reference to FIG. 16 and FIG. 17.

Figure 16:
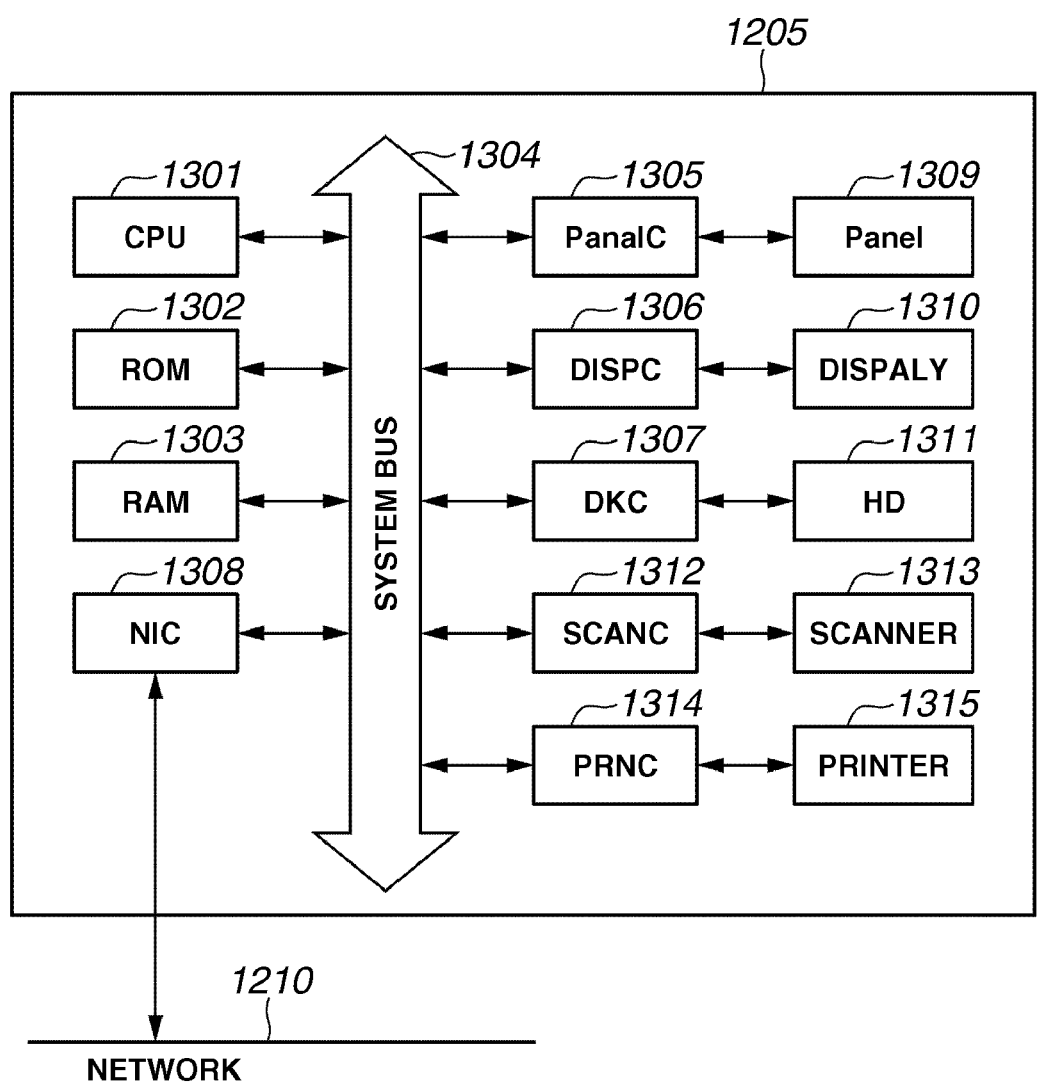
FIG. 16 illustrates an exemplary system configuration of a printing apparatus 1205 of the present invention.

Referring to FIG. 16, a CPU 1301 executes software stored on a ROM 1302 and an HD 1311 which is described below. The CPU 1301 exercises control over devices in communication with each other via a system bus 1304. The ROM 1302 or the HD 1311 stores a program for processing illustrated in a flow chart in FIG. 18 which is described below.

A RAM 1303 functions as a main memory and a work area for the CPU 1301.

A panel controller (PanelC) 1305 controls an input of an instruction via an operation panel (Panel) 1309 included in the printing apparatus 1205.

A display controller (DISPC) 1306 controls display of a display module (DISPLAY) 1310 including a liquid crystal display.

A disk controller (DKC) 1307 controls the HD 1311.

A network interface card (NIC) 1308 performs an interactive data communication with the client PC 1201 and the print control information generation server 220 via the network 1210.

A scanner controller (SCANC) 1312 controls an optical scanner 1313 included in the printing apparatus 1205 to read an image on a paper document.

A printer controller (PRNC) 1314 controls a printer 1315 included in the printing apparatus 1205 to perform printing on an actual print paper utilizing a publicly known printing method such as an electrophotographic printing method and an inkjet printing method.

Figure 17:
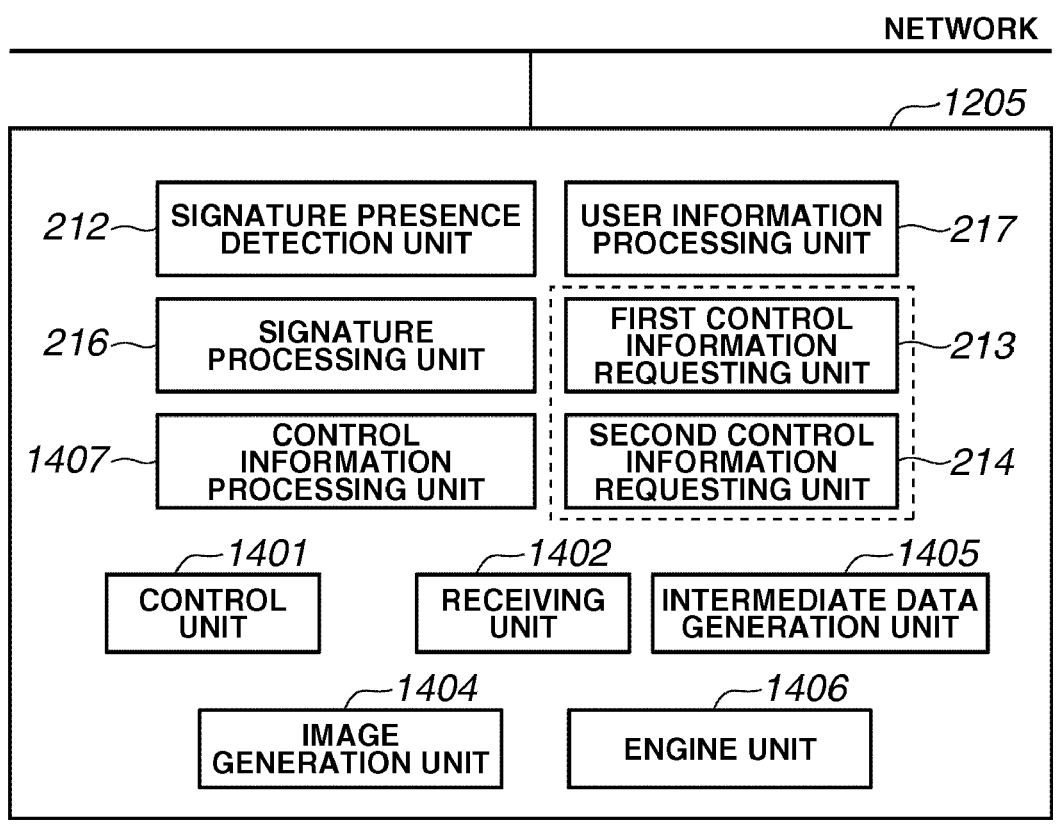
FIG. 17 illustrates an exemplary module configuration of the printing apparatus 1205 of the present invention.

Referring to FIG. 17, the signature presence detection unit 212, the signature processing unit 216, the user information processing unit 217, the first control information requesting unit 213, and the second control information requesting unit 214 performs processing similar to the processing performed by those modules having the same unit name and reference numeral in the printer driver 210 illustrated in FIG. 3.

A control unit 1401 controls the engine unit 1406 to allow the engine unit 1406 to perform printing of generated image data.

The receiving unit 1402 receives a print job, a document, and control information from the client PC 1201 on the network. The receiving unit 1402 can also receive a document from a storage area provided on the HD 1311 which is included in the printing apparatus 1205 for storing a document.

An intermediate data generation unit 1405 generates intermediate data according to the received print job.

The image data generation unit 1404 performs image generation processing based on intermediate data generated by the intermediate data generation unit 1405 to generate image data.

The engine unit 1406 actually prints the image data on a print medium such as a print paper utilizing a publicly known printing method such as an electrophotographic printing method and an inkjet printing method. The engine unit 1406 herein refers to a printer engine.

The control information processing unit 1407, before performing processing in the image data generation unit 1404 and the intermediate data generation unit 1405, checks whether the print settings for the received job is permitted according to the control information.

The control information processing unit 1407 can be configured to control and restrict the function provided by the printing apparatus 1205 according to the control information and change the settings for the processing related to the document such as the print job according to the control information.

Now, the processing performed by the printing apparatus 1205 will be described below. The printing apparatus 1205 interactively communicates with the print control information generation server 220 to acquire control information similar to the first and the second exemplary embodiments.

Accordingly, the processing according to the program performed by the printing apparatus 1205 can be illustrated by a flow chart of processing similar to the flow charts illustrated in FIGS. 12 and 14. With respect to the print control information generation server 220, the CPU 1301 performs the processing similar to the first and the second exemplary embodiments.

Figure 18:
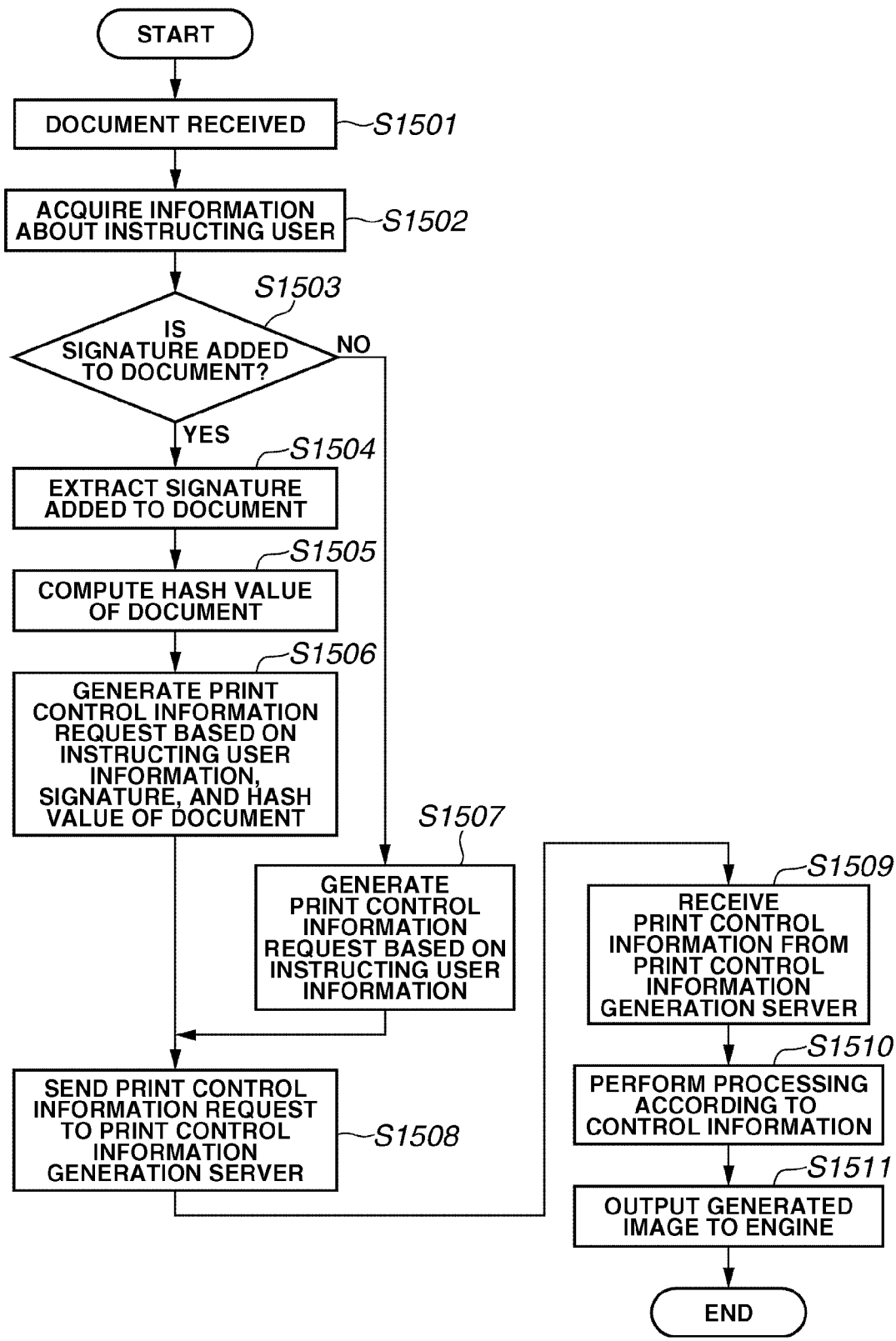
FIG. 18 is a flow chart of processing performed by the printing apparatus 1205 when print control information is acquired to perform printing and outputting according to a third exemplary embodiment of the present invention.

Now, an example of the processing performed by the printing apparatus 1205 will be described below which acquires print control information and performs printing and outputting according to the third exemplary embodiment with reference to a flow chart according to the program executed by the CPU 1301 in FIG. 18.

In step S1501, the receiving unit 1402 receives a document from a PC on the network to which the printing apparatus 1205 is connected. According to the present exemplary embodiment, a document can be previously stored in a storage area included in the printing apparatus 1205 and the receiving unit 1402 can receive the stored document.

In addition, the receiving unit 1402 can directly receive a document from personal digital assistant or an external storage medium via a USB interface (not shown).

In step S1502, the user information processing unit 217 acquires information about the instructing user who has generated an instruction for printing. In the present exemplary embodiment, the user information processing unit 217 identifies and acquires the instructing information about the user who has instructed printing, from the document to be printed.

The method for acquiring the instructing user information according to the present embodiment is not limited to the above-described method. That is, the instructing user information processing unit 217 can acquire information directly entered by the user via the operation panel 1309 of the printing apparatus 1205.

In step S1503, the signature presence detection unit 212 detects whether a signature is added to the document. If it is detected that a signature is added to the document, then the process advances to step S1504. On the other hand, if it is detected that no signature is added to the document, then the process advances to step S1507.

In step S1504, the signature processing unit 216 extracts the signature added to the document, and the printing apparatus 1205 acquires the signature from the document.

In step S1505, the signature processing unit 216 computes a hash value of the document data.

In step S1506, the first control information requesting unit 213 generates a print control information request, and then the process advances to step S1508. Here, the print control information request is generated based on the instructing user information acquired in step S1502, the signature extracted in step S1504, and the hash value of the document data computed in step S1505. More specifically, the print control information request is the print control information request 930 illustrated in FIG. 9 including instructing user information, a signature, and a hash value.

In step S1507, the second control information requesting unit 214 generates a print control information request based on the instructing user information.

The processing performed in step S1508 and beyond are performed according to the print control information requested by the first control information requesting unit 213 or the second control information requesting unit 214.

In step S1508, the first control information requesting unit 213 or the second control information requesting unit 214 sends the print control information request generated in step S1506 or step S1507 to the print control information generation server 220.

In step S1509, the first control information requesting unit 213 or the second control information requesting unit 214 receives print control information from the print control information generation server 220 in response to the print control information request.

In step S1510, the control information processing unit 1407 accesses the print control information generation server 220 and the print right list management DB 240 to detect whether the print setting instructed by the user is permitted according to the print control information.

If the print setting instructed by the user is permitted according to the print control information, then the intermediate data generation unit 1405 generates intermediate data and the image data generation unit 1404 generates image data based on the generated intermediate data. On the other hand, if restriction is put on the print setting instructed by the user according to the print control information, then the CPU 1301 cancels the print job and ends the processing.

In this case, the CPU 1301 can notify the user that the print job has been canceled by displaying a notification via a display module 1310.

In step S1511, the CPU 1301 outputs the image data generated in step S1510, to the engine unit 1406. Then the engine unit 1406 performs print processing.

In the present exemplary embodiment, the processing performed by 1205 is described with reference to the flow chart similar to the flow chart illustrated in FIG. 12. However, the processing performed by the printing apparatus 1205 can also be performed according to the flow similar to that illustrated in FIG. 14. In this case, main difference with respect to the processing is that the processing in steps S1001, S1008, and S1009 in the flow chart in FIG. 14 is substituted with the processing similar to that performed in steps S1501, S1510, and S1511 in the flow chart of FIG. 18.

Here, suppose that the document stored in the storage area in the printing apparatus 1205 according to the present exemplary embodiment is sent to an external device via a network.

In this case, when certification information is extracted from the document just as in the case of the exemplary embodiments described above and thus the CPU 1301 acquires control information which enables to externally send data, document data can be sent via the network regardless of the authority of the user who has instructed the sending. In the above-described configuration, the printing function and the SEND function provided by the printing apparatus can be utilized as an exception owing to the certification information of the document regardless of the authority of the user.

Other Exemplary Embodiments

The exemplary embodiments of the present invention are as described above. The present invention can be applied to a system including a plurality of devices and to an apparatus including only one device. For example, the present invention can be implemented in a printer, a facsimile machine, a PC, and a computer system including a server and a client.

The present invention can be implemented by directly or remotely supplying a program of software implementing functions of the above-described exemplary embodiments to a system or an apparatus and reading and executing supplied program codes with the system or a computer of the apparatus.

Accordingly, the program code itself, which is installed to the computer for implementing the functional processing of the present invention with the computer, realizes the present invention. That is, the present invention also includes the computer program implementing the functional processing of the present invention.

In that case, the program can be configured in any form, such as object code, a program executed by an interpreter, and script data supplied to an OS.

As the recording medium for supplying such program code, a flexible disk, a hard disk, an optical disk, a magneto-optical disk, an MO, a CD-read only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

The above program can also be supplied by connecting to a web site on the Internet using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above embodiments can also be implemented by dividing the program code into a plurality of files and downloading each divided file from different web sites. That is, a WWW server that allows a plurality of users to download the program file for implementing the functional processing constitutes the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code using the key information.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-194351 filed Jul. 14, 2006, which is hereby incorporated by reference herein in its entirety.

What is claimed is:

1. An information processing method in an information processing apparatus that acquires restriction information for restricting use of a function provided by a configuration of at least one of a network connection unit, a printer unit, and a scanner unit which are included in a peripheral apparatus, comprising:
a user information acquiring step of acquiring, using a processor, user information about a user who wishes to use the function provided by the peripheral apparatus;
a determining step of determining, using the processor, when performing processing on a document using the function provided by the peripheral apparatus, whether or not the document includes an electronic signature e-signed by an authorized user;
an acquiring step of acquiring, using the processor, restriction information corresponding to authorized user information included in the electronic signature on the document rather than the user information acquired in the user information acquiring step, if it is determined that the document includes the electronic signature e-signed by the authorized user;
a notification step of notifying that printing is performed by authority not of the user but of the authorized user, when it is determined that the document includes the electronic signature e-signed by the authorized user; and
a sending step of sending, using the processor, processing information for using the function provided by the peripheral apparatus in accordance with the restriction information acquired in the acquiring step to the peripheral apparatus,
wherein, the acquiring step acquires restriction information corresponding to the user information acquired in the user information acquiring step, if the determining step determines that the document does not include the authorization information, and
wherein the restriction information corresponding to the authorized user information and the restriction information corresponding to the user information have different restriction contents being described.

2. The information processing method according to claim 1, wherein the function provided by the peripheral apparatus includes at least one of a color/monochrome printing function, a one-sided/two-sided printing function, an n-up function, and a SEND function, and
wherein restriction based on the restriction information is to prohibit at least one of color printing, one-sided printing, 1-up printing, and SEND processing from being performed on a document.

3. The information processing method according to claim 1, wherein when the electronic signature is unauthorized authorization information, the acquiring step acquires restriction information corresponding to the user information acquired in the user information acquiring step.

4. The information processing method according to claim 1, wherein the processing information includes print data generated using the document and the restriction information.

5. The information processing method according to claim 1, wherein the processing information includes the document and the restriction information.

6. The information processing method according to claim 1, wherein the processing information includes the document and print data generated based on the restriction information.

7. An information processing apparatus that acquires restriction information for restricting use of a function provided by a configuration of at least one of a network connection unit, a printer unit, and a scanner unit which are included in a peripheral apparatus, comprising:
at least one processor coupled via a bus to a memory, the processor being programmed to control one or more of:
a user information acquiring unit configured to acquire user information about a user who wishes to use the function provided by the peripheral apparatus;
a determining unit configured to determine when performing processing on a document using the function provided by the peripheral apparatus, whether or not the document includes an electronic signature e-signed by an authorized user;
an acquiring unit configured to acquire restriction information corresponding to authorized user information included in the electronic signature on the document rather than the user information acquired by the user information acquiring unit, if it is determined that the document includes the electronic signature e-signed by the authorized user;

a notification unit configured to notify that printing is performed by authority not of the user but of the authorized user, when the determining unit determines that the document includes the electronic signature e-signed by the authorized user; and a sending unit for sending processing information for using the function provided by the peripheral apparatus in accordance with the restriction information acquired by the acquiring unit to the peripheral apparatus, wherein, the acquiring unit acquires restriction information corresponding to the user information acquired by the user information acquiring unit, if the determining unit determines that the document does not include the authorization information, and wherein the restriction information corresponding to the authorized user information and the restriction information corresponding to the user information have different restriction contents being described.

8. The information processing apparatus according to claim 7, wherein the function provided by the peripheral apparatus includes at least one of a color/monochrome printing function, a one-sided/two-sided printing function, an n-up function, and a SEND function.

9. The information processing apparatus according to claim 7, wherein when the electronic signature is unauthorized authorization information, the acquiring unit acquires restriction information corresponding to the user information acquired by the user information acquiring unit.

10. A non-transitory computer readable storage medium on which is stored a computer program for making a computer execute a method, the method comprising the steps of:

a user information acquiring step of acquiring, using a processor, user information about a user who wishes to use the function provided by the peripheral apparatus;

a determining step of determining, using the processor, when performing processing on a document using the function provided by the peripheral apparatus, whether or not the document includes an electronic signature e-signed by an authorized user;

an acquiring step of acquiring, using the processor, restriction information corresponding to authorized user information included in the electronic signature on the document rather than the user information acquired in the user information acquiring step, if it is determined that the document includes the electronic signature e-signed by the authorized user;

a notification unit configured to notify that printing is performed by authority not of the user but of the authorized user, when the determining unit determines that the document includes the electronic signature e-signed by the authorized user; and a sending step of sending, using the processor, processing information for using the function provided by the peripheral apparatus in accordance with the restriction information acquired in the acquiring step to the peripheral apparatus, wherein the restriction information is information for restricting use of the function provided by the peripheral apparatus, and wherein, the acquiring step acquires restriction information corresponding to the user information acquired in the user information acquiring step, if the determining unit determines that the document does not include the authorization information, and wherein the restriction information corresponding to the authorized user information and the restriction information corresponding to the user information have different restriction contents being described.

11. A peripheral apparatus that provides a function by using a configuration of at least one of a network connection unit, a printer unit, and a scanner unit, comprising:

at least one processor coupled via a bus to a memory, the processor being programmed to control one or more of:

a user information acquiring unit for acquiring user information about a user who wishes to use the function provided by the peripheral apparatus;

a determining unit for determining when performing processing on a document using the function provided by the peripheral apparatus, whether or not the document includes authorization information set by an authorized user;

an acquiring unit for acquiring restriction information corresponding to authorized user information included in the authorization information on the document rather than the user information acquired by the user information acquiring unit, if the determining unit determines that the document includes the authorization information set by the authorized user;

a notification unit configured to notify that printing is performed by authority not of the user but of the authorized user, when the determining unit determines that the document includes the authorization information set by the authorized user; and a processing unit for performing processing on the document using the function provided by the peripheral apparatus in accordance with the restriction information acquired by the acquiring unit, wherein the acquiring unit acquires restriction information corresponding to the user information acquired by the user information acquiring unit, if the determining unit determines that the document does not include an electronic signature, and wherein the restriction information corresponding to the authorized user information and the restriction information corresponding to the user information have different restriction contents being described.

12. The peripheral apparatus according to claim 11, wherein the function provided by the peripheral apparatus includes at least one of a color/monochrome printing function, a one-sided/two-sided printing function, an n-up function, and a SEND function.

13. The peripheral apparatus according to claim 11, wherein when the authorization information is unauthorized authorization information, the acquiring unit acquires restriction information corresponding to the user information acquired by the user information acquiring unit.

14. An information processing method in a peripheral apparatus that provides a function by using a configuration of at least one of a network connection unit, a printer unit, and a scanner unit, comprising:

a user information acquiring step of acquiring, using a processor, user information about a user who wishes to use the function provided by the peripheral apparatus;

a determining step of determining, using the processor, when performing processing on a document using the function provided by the peripheral apparatus, whether or not the document includes an electronic signature e-signed by an authorized user;

an acquiring step of acquiring, using the processor, restriction information corresponding to authorized user information included in the electronic signature on the document rather than the user information acquired in the user information acquiring step, if it is determined that the document includes the electronic signature e-signed by the authorized user;

a notification step of notifying that printing is performed by authority not of the user but of the authorized user, when it is determined that the document includes authorization information set by the authorized user; and a processing step of performing processing on the document by the processor using the function provided by the peripheral apparatus in accordance with the restriction information acquired in the acquiring step, wherein, the acquiring step acquires restriction information corresponding to the user information acquired in the user information acquiring step, if the determining step determines that the document does not include the authorization information, and wherein the restriction information corresponding to the authorized user information and the restriction information corresponding to the user information have different restriction contents being described.

* * * * *